United States Patent
Mine et al.

(10) Patent No.: US 7,628,546 B2
(45) Date of Patent: Dec. 8, 2009

(54) OPTICAL CONNECTOR

(75) Inventors: Keiji Mine, Osaka (JP); Hiroshi Nakagawa, Osaka (JP); Takeshi Isoda, Osaka (JP)

(73) Assignee: Hosiden Corporation, Osaka (JP)

( * ) Notice: Subject to any disclaimer, the term of this patent is extended or adjusted under 35 U.S.C. 154(b) by 197 days.

(21) Appl. No.: 11/442,370

(22) Filed: May 25, 2006

(65) Prior Publication Data

US 2006/0274996 A1 Dec. 7, 2006

(30) Foreign Application Priority Data

Jun. 1, 2005 (JP) ............................. 2005-161580

(51) Int. Cl.
*G02B 6/36* (2006.01)
(52) U.S. Cl. .......................... 385/92; 385/76
(58) Field of Classification Search .............. 385/53–94
See application file for complete search history.

(56) References Cited

U.S. PATENT DOCUMENTS

| | | | |
|---|---|---|---|
| 4,636,034 A | | 1/1987 | Kashimura et al. |
| 4,792,699 A | * | 12/1988 | Duncan ...................... 250/577 |
| 4,815,810 A | | 3/1989 | Betzler et al. |
| 4,986,625 A | | 1/1991 | Yamada et al. |
| 5,231,685 A | * | 7/1993 | Hanzawa et al. .............. 385/84 |
| 5,436,995 A | * | 7/1995 | Yoshizawa et al. ............. 385/86 |
| 5,522,001 A | * | 5/1996 | Meadowcroft ................ 385/88 |
| 5,818,806 A | * | 10/1998 | Wong et al. .............. 369/53.33 |
| 5,828,806 A | * | 10/1998 | Grois et al. ................... 385/78 |
| 5,917,976 A | * | 6/1999 | Yamaguchi .................. 385/88 |
| 6,130,977 A | * | 10/2000 | Rosson ........................ 385/76 |

(Continued)

FOREIGN PATENT DOCUMENTS

EP 836104 A1 * 4/1998

(Continued)

OTHER PUBLICATIONS

CN—First Office Action, Jul. 4, 2008, Hosiden Corporation, English translation.

(Continued)

*Primary Examiner*—Frank G Font
*Assistant Examiner*—Peter Radkowski
(74) *Attorney, Agent, or Firm*—David N. Lathrop

(57) ABSTRACT

The object of the present invention is to suppress a decrease in the optical function of a sleeve by ensuring that a liquid chemical substance is not apt to remain on a peripheral surface of the sleeve even when the liquid chemical substance enters a connector. The present invention relates to an optical connector which is connected to an optical plug holding an optical fiber to a terminal end of which a ferrule is attached. The optical connector of the present invention has a guide pipe into which a ferrule is inserted and on an inner circumferential surface of which a supporting portion (a convexity) is formed, a light-emitting device, a light-receiving device, and a sleeve which is positioned by the supporting portion and optically connects the light-emitting device, the light-receiving device and the optical fiber. According to the present invention, there is a space between the guide pipe and the sleeve and, therefore, the phenomenon that a chemical substance adheres to a wide area and remains does not occur.

3 Claims, 23 Drawing Sheets

U.S. PATENT DOCUMENTS

| | | | |
|---|---|---|---|
| 6,227,721 B1 * | 5/2001 | Naito et al. | 385/78 |
| 6,254,283 B1 * | 7/2001 | Novacoski et al. | 385/78 |
| 6,276,843 B1 * | 8/2001 | Alcock et al. | 385/90 |
| 6,280,098 B1 * | 8/2001 | Alcock et al. | 385/64 |
| 6,302,596 B1 * | 10/2001 | Cohen et al. | 385/93 |
| 6,409,398 B2 * | 6/2002 | Nakaya et al. | 385/93 |
| 6,443,630 B1 * | 9/2002 | Serizawa | 385/88 |
| 6,591,056 B1 * | 7/2003 | Wall et al. | 385/147 |
| 6,709,169 B2 * | 3/2004 | Rossi | 385/92 |
| 7,241,056 B1 * | 7/2007 | Kuffel et al. | 385/60 |
| 2004/0218872 A1 | 11/2004 | Low | |
| 2006/0051033 A1 * | 3/2006 | Tabata et al. | 385/93 |

FOREIGN PATENT DOCUMENTS

| | | | |
|---|---|---|---|
| EP | 0 969 300 A2 | | 1/2000 |
| EP | 0 978 742 A2 | | 2/2000 |
| EP | 1 146 371 A2 | | 10/2001 |
| EP | 06 011 200.0 | | 12/2007 |
| JP | 59170809 A | * | 9/1984 |
| JP | 60201307 A | * | 10/1985 |
| JP | 61095306 A | * | 5/1986 |
| JP | 63149611 A | * | 6/1988 |
| JP | 63311314 A | * | 12/1988 |
| JP | 01 169416 A | | 7/1989 |
| JP | 02245710 A | * | 10/1990 |
| JP | 03259106 A | * | 11/1991 |
| JP | 03291608 A | * | 12/1991 |
| JP | 04095906 A | * | 3/1992 |
| JP | 05011149 A | * | 1/1993 |
| JP | 05249351 A | * | 9/1993 |
| JP | 06310807 A | * | 11/1994 |
| JP | 08240749 A | * | 9/1996 |
| JP | 08334654 A | * | 12/1996 |
| JP | 09015447 A | * | 1/1997 |
| JP | 09145966 A | * | 6/1997 |
| JP | 10123361 A | * | 5/1998 |
| JP | 10268162 A | * | 10/1998 |
| JP | 10300979 A | * | 11/1998 |
| JP | 2000131564 A | * | 5/2000 |
| JP | 2000-193849 | | 7/2000 |
| JP | 2000193849 A | * | 7/2000 |

OTHER PUBLICATIONS

CN—Second Office Action, Dec. 19, 2008, Hosiden Corporation.

* cited by examiner

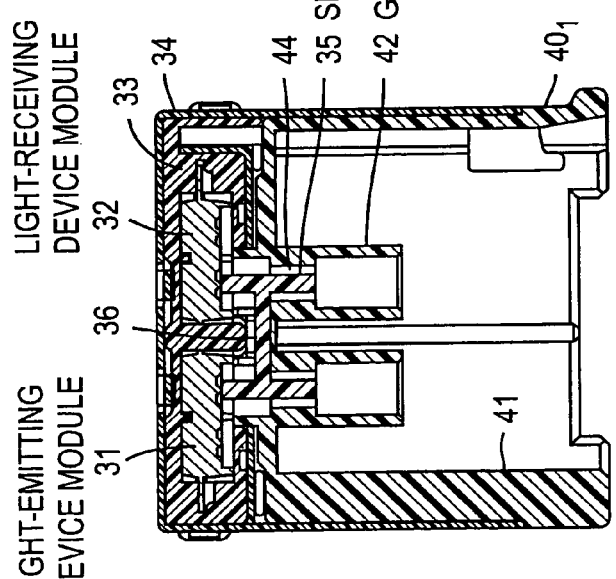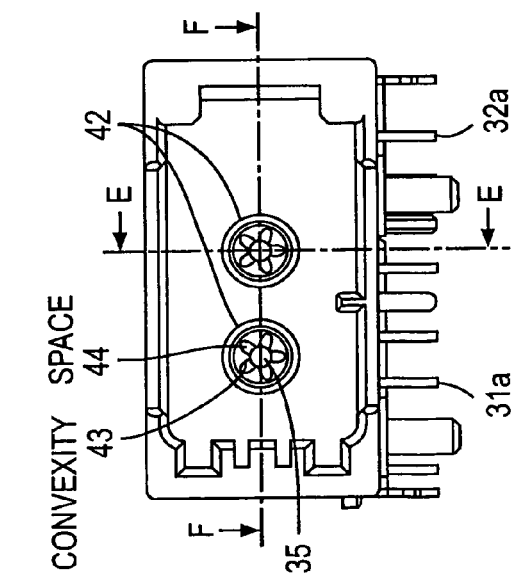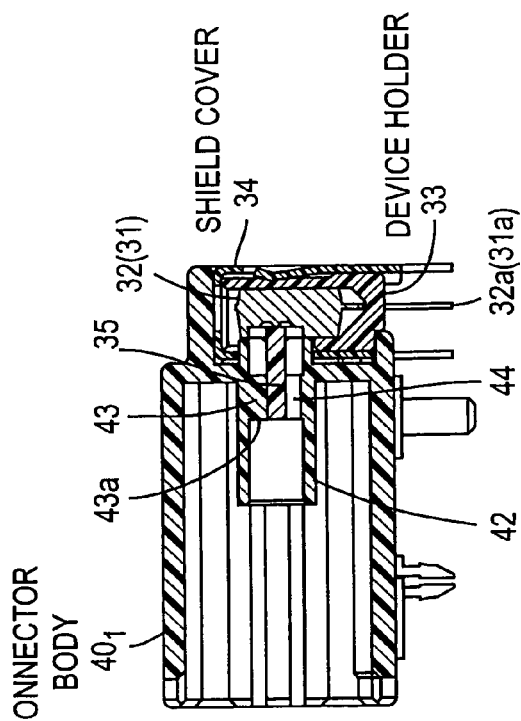

401 CONNECTOR BODY

42 GUIDE PIPE
43a
43 CONVEXITY

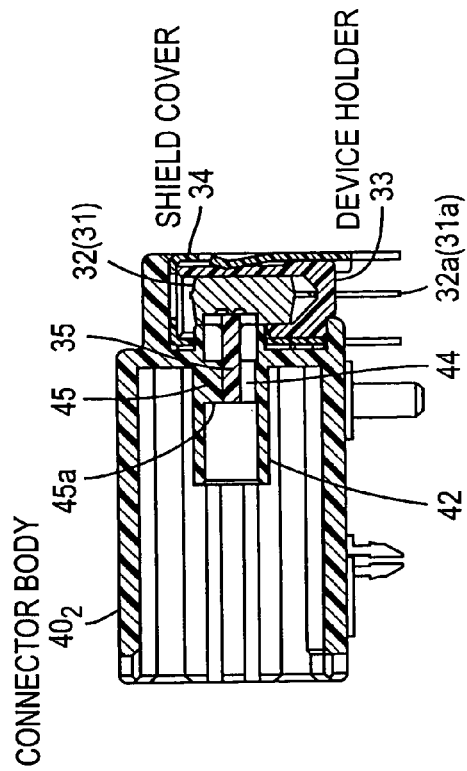
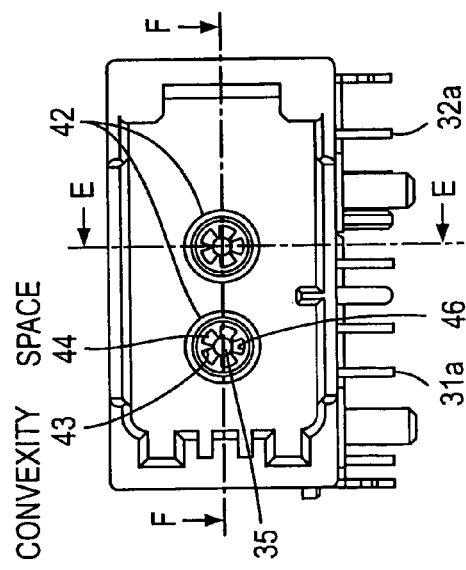
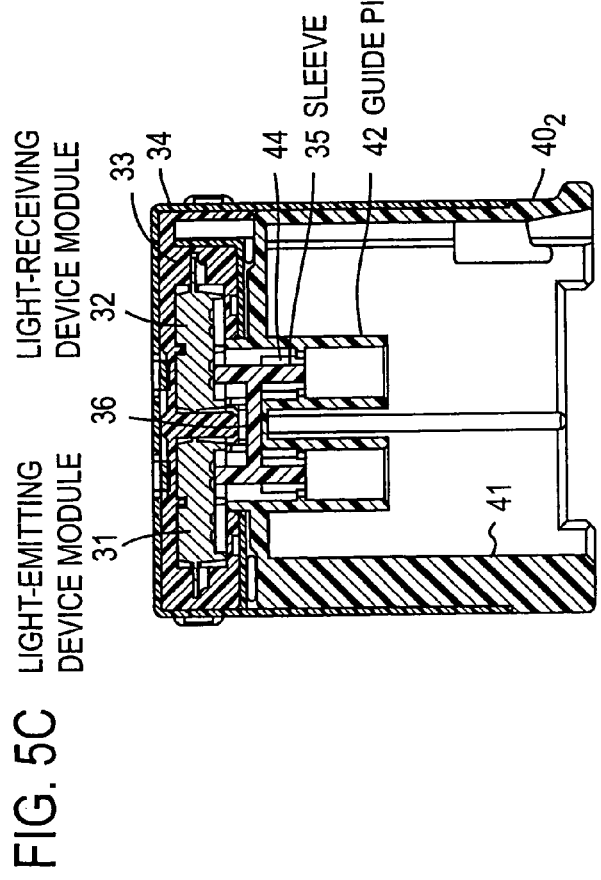

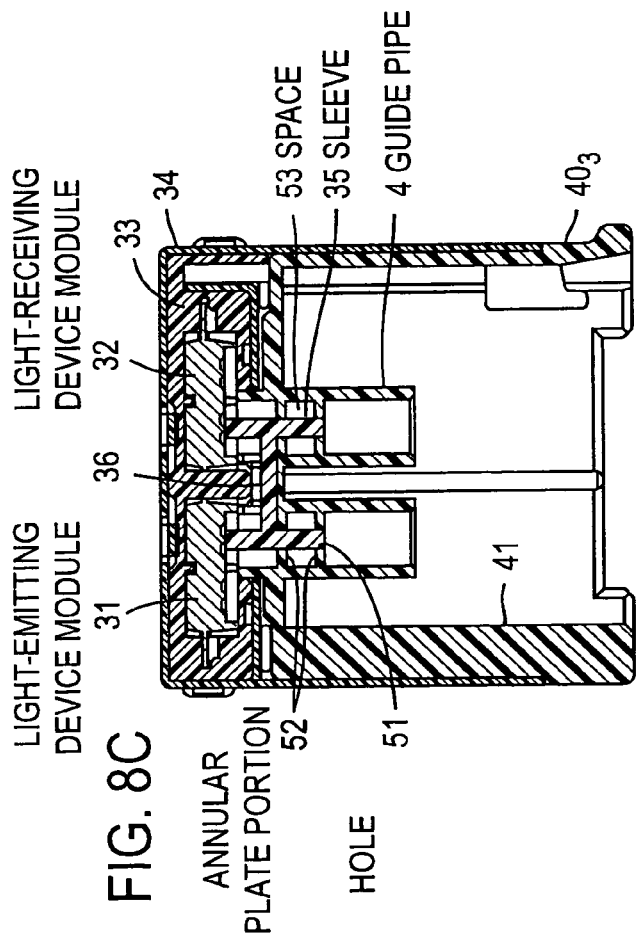
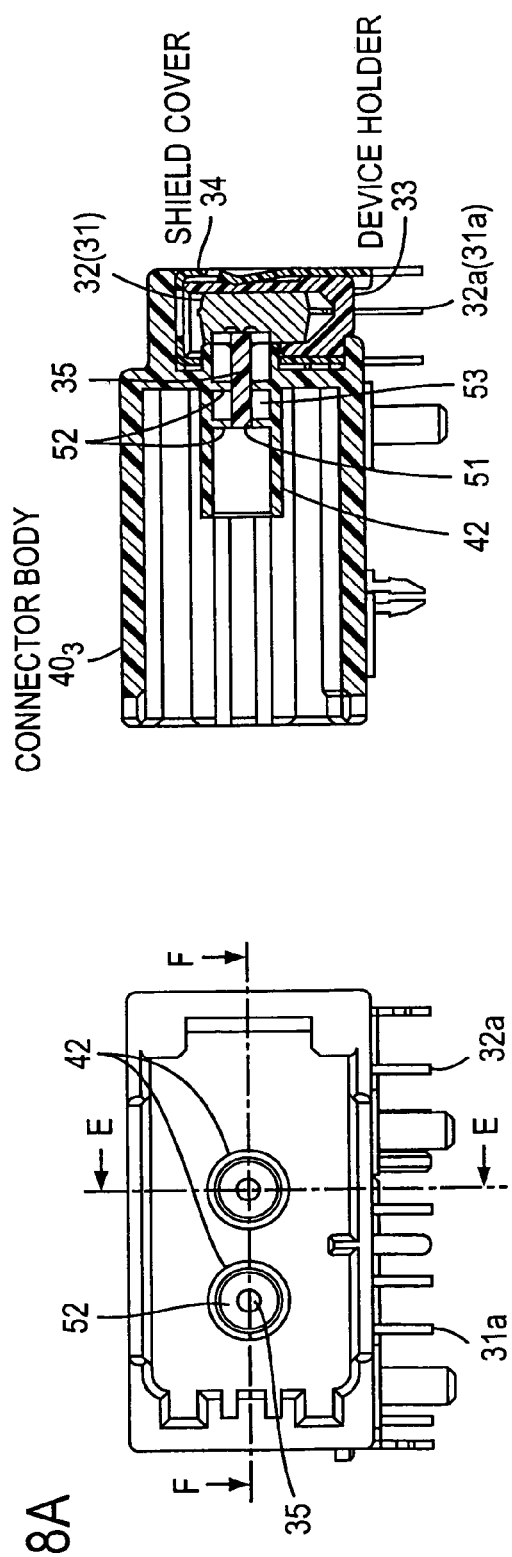

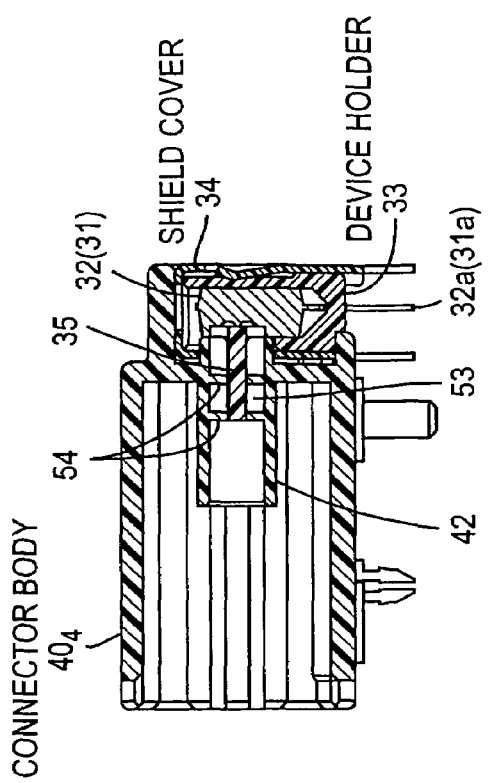
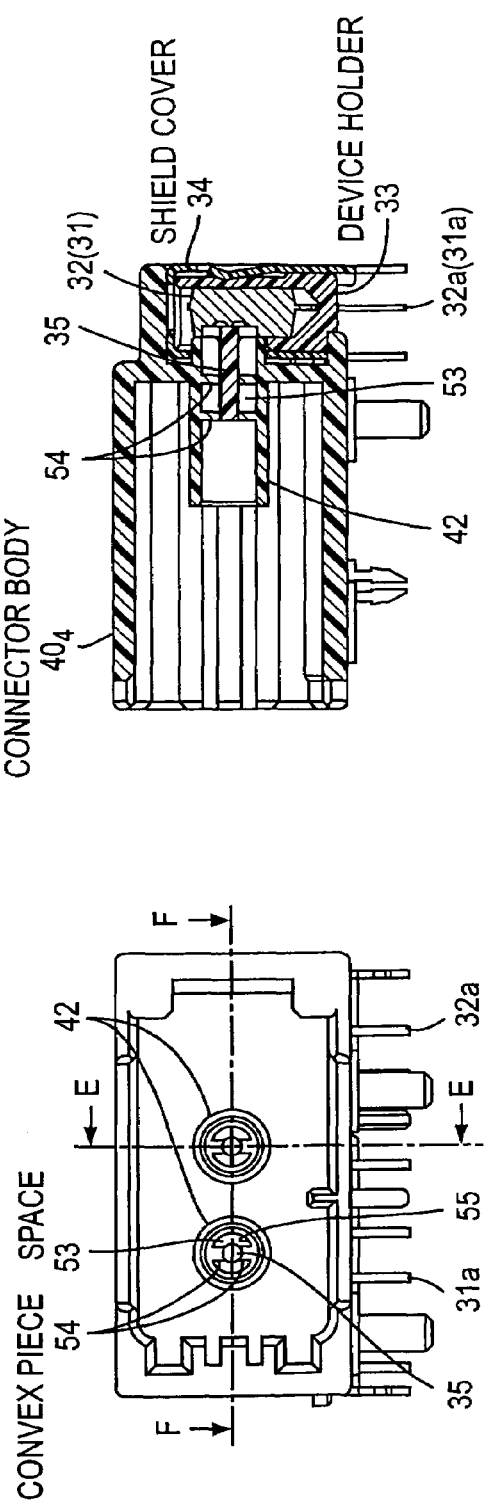
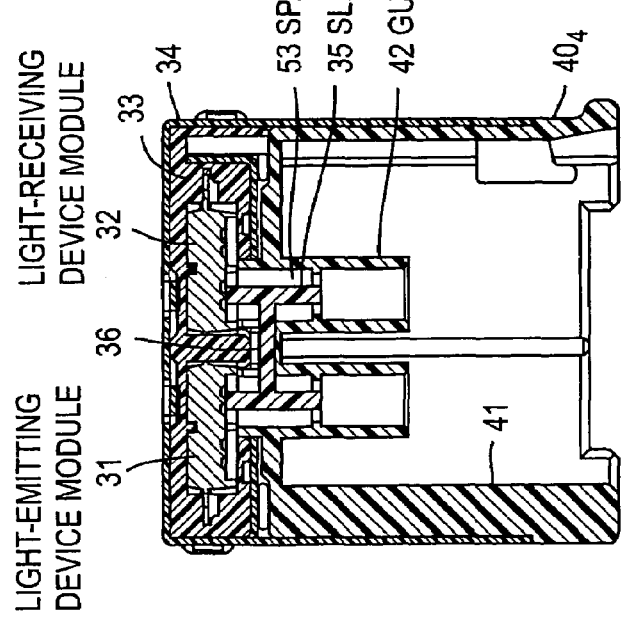

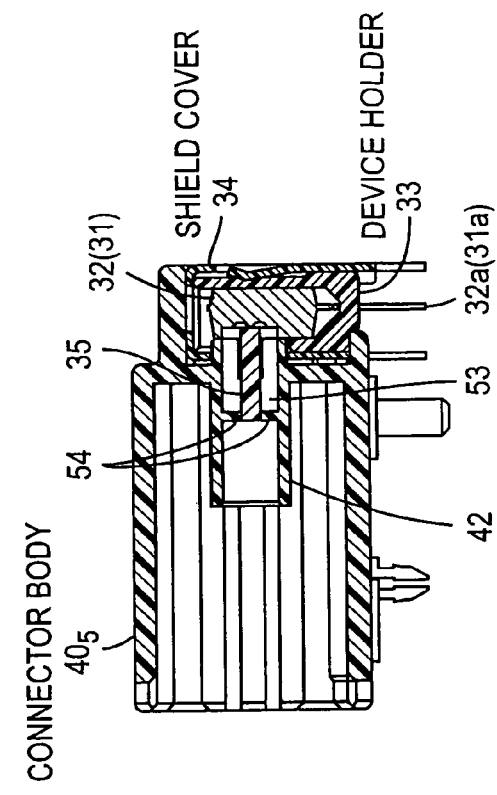
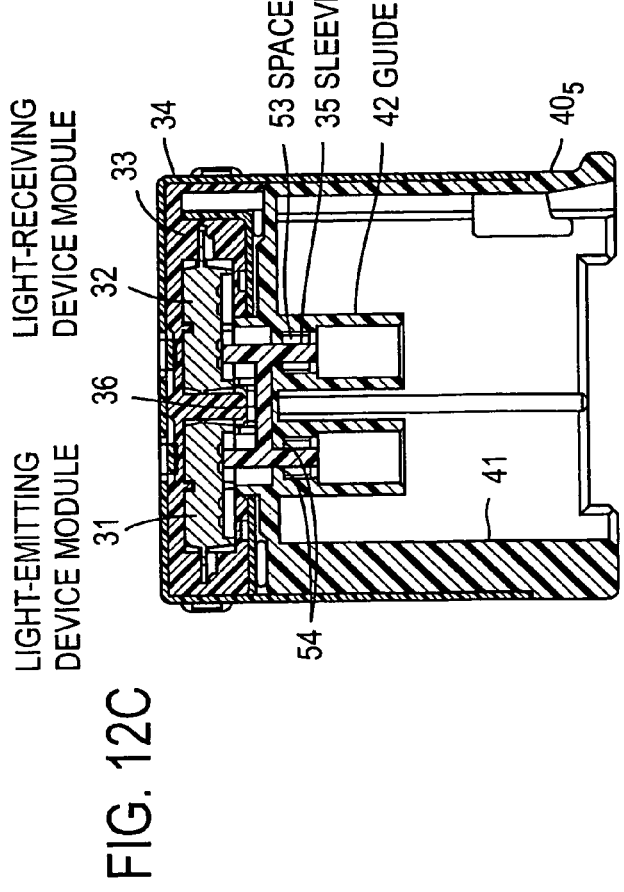
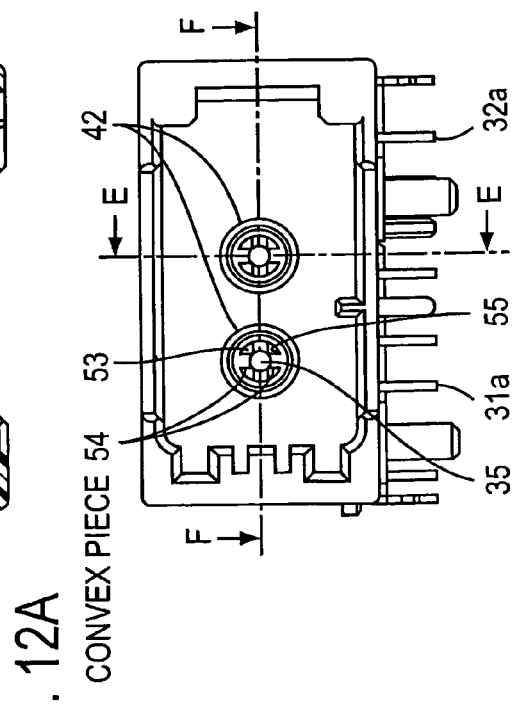

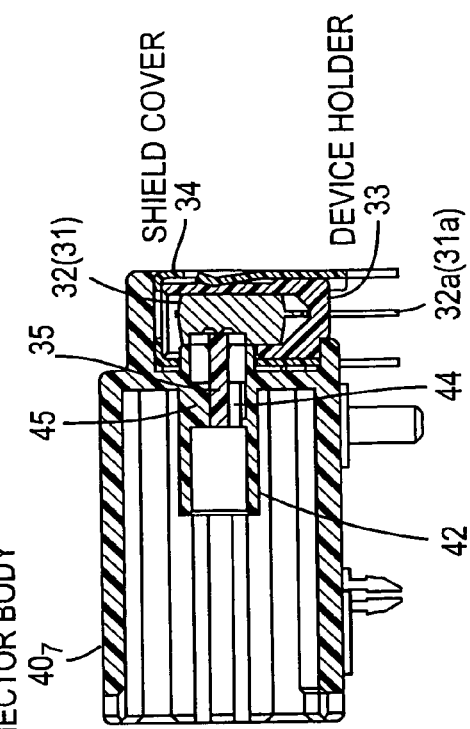
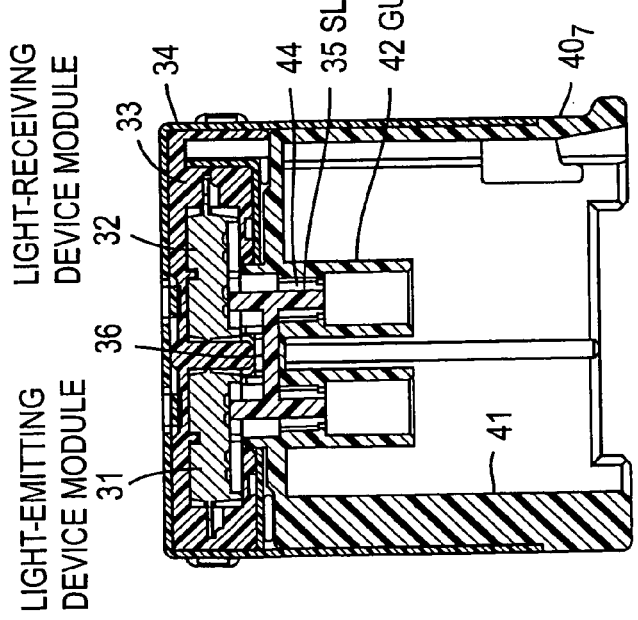
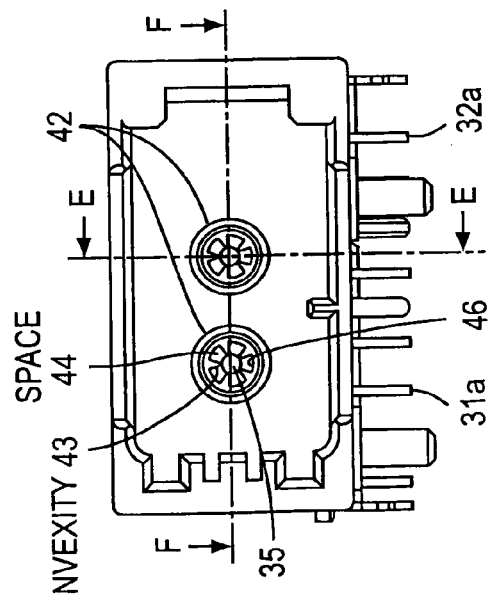

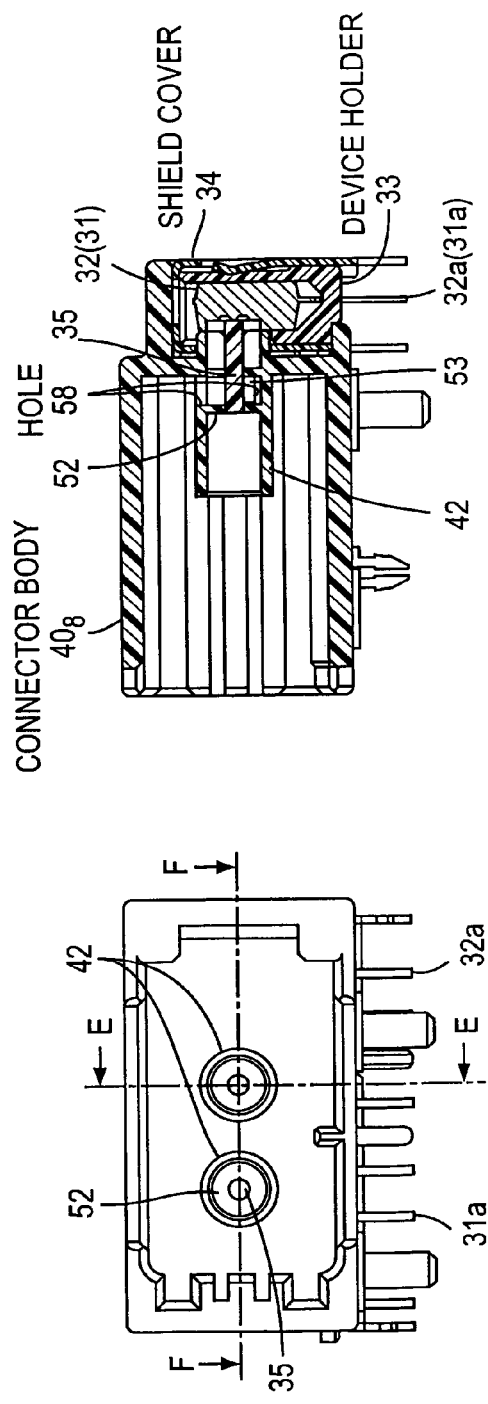

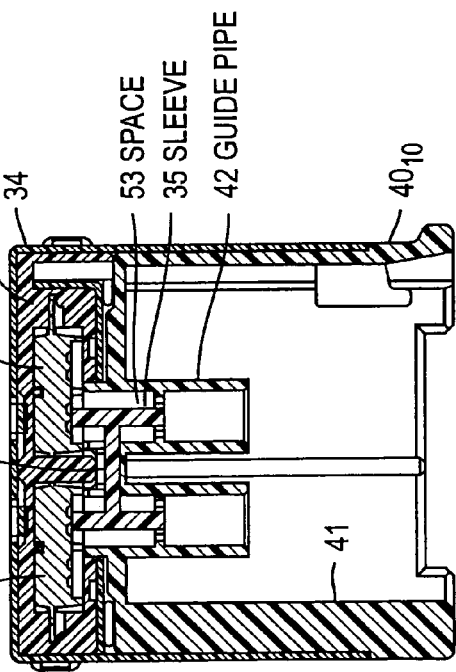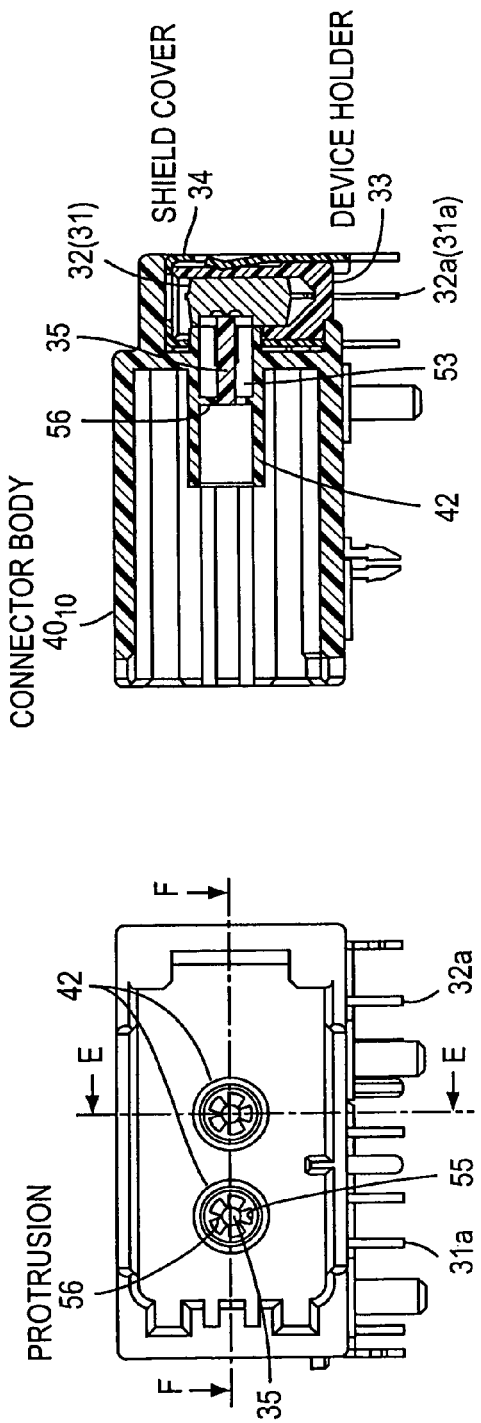
FIG. 22A
FIG. 22B
FIG. 22C

OPTICAL CONNECTOR

FIELD OF THE INVENTION

The present invention relates to a connector for two-way optical communication. More particularly, the invention relates to an optical connector in which there are incorporated a light-emitting device, a light-receiving device, and a sleeve for optically connecting the light-emitting device, the light-receiving device, and an optical fiber to which an opposed optical plug is attached.

DESCRIPTION OF RELATED ART

FIGS. 1A and 1B show an example of a conventional construction of a connector for two-way optical communication. FIG. 1A shows an optical connector (a receptacle) disposed on the equipment side and FIG. 1B shows an optical plug which is connected to the optical connector by being fitted into this optical connector.

A pair of housing chambers 12 is formed in a housing 11 of an optical connector 10. A light-emitting device module (a sending module) 13 and a light-receiving device module (a receiving module) 14 are respectively housed in these housing chambers 12. Ahead of each of the two housing chambers 12, a guide pipe 15 which extends forward is provided, and a sleeve 16 is inserted into each of these guide pipes 15. In FIG. 1A, the reference numeral 17 denotes a cap which is attached to the back surface and the reference numeral 18 denotes a back seat which supports the light-emitting device module 13 and the light-receiving device module 14.

On the other hand, as shown in FIG. 1B, an optical plug 20 is provided with a pair of optical fibers 22 to a terminal end of each of which a ferrule 21 is attached, a housing 24 having a cylindrical partition wall 23 which houses the ferrule 21 inside and protects the ferrule 21, a spring cap 25 which is fixed to the housing 24 by being fitted into this housing, and a boot 26 which is fitted onto a rear part of the spring cap 25. In FIG. 1B, the reference numeral 27 denotes a spring which pushes the ferrule 21 forward.

When the optical plug 20 is fitted into the optical connector 10, the optical connector 10 and the optical plug 20 being constructed as described above, the pair of ferrules 21 holding the optical fiber 22 is inserted into the guide pipe 15 and a leading end surface of the ferrule 21 at which an end surface of the optical fiber 22 is exposed becomes opposed, via a very small gap, to a leading end surface of the sleeve 16 which is inserted into the guide pipe 15, whereby the two optical fibers 22, the light-emitting device module 13, and light-receiving device module 14 are each optically connected via the sleeve 16. Incidentally, the sleeve 16 has such a construction that, for example, an optical fiber 16a is housed in a cylindrical holder 16b (for example, Japanese Patent Application Laid-Open No. 2000-193849).

Incidentally, connectors for two-way optical communication as described above are used in various applications. For example, in the case of car-mounted applications, under some environmental conditions and in some handling ways, such connectors for two-way optical communication have had the problem that chemical substances such as oils and solvents adhere.

However, as shown in FIG. 1A, in a conventional optical connector which is provided with a sleeve which optically connects a light-emitting device, a light-receiving device, and an optical fiber of a mating optical plug, the sleeve is attached by being inserted into a guide pipe. That is, the sleeve has such a construction that the sleeve is fitted into a hole and, for this reason, when a liquid chemical substance enters the guide pipe, the chemical substance is apt to enter a minute gap between the peripheral surface of the sleeve and the hole by the capillary phenomenon.

The liquid chemical substance which has entered the gap between the peripheral surface of the sleeve and the hole adheres to the peripheral surface of the sleeve in a wide area, does not vaporize and apt to remain for a long period of time. And it has been difficult to wash away the chemical substance even by cleaning the connector with water and the like.

On the other hand, from the standpoint of cost, sleeves made of resin are generally used. If liquid chemical substances such as oils, solvents and chemicals which adhere to a sleeve are left as they are in a case where the sleeve material is resin, erosion and melting proceed gradually and transmittance and surface roughness worsen, thereby posing the problem that the optical function of the sleeve decreases.

Therefore, the present invention has as its object the provision of an optical connector which can suppress a decrease in the optical function of a sleeve even when a liquid chemical substance enters the connector.

BRIEF SUMMARY OF THE INVENTION

The present invention relates to an optical connector which is connected to an optical plug holding an optical fiber to which a ferrule is attached. An optical connector of the present invention has a light-emitting device or a light-receiving device; a sleeve for light-emitting device which optically connects the light-emitting device or the light-receiving device and the optical fiber; and a guide pipe which positions the sleeve and has a supporting portion on an inner circumferential surface thereof so that a space is formed between the guide pipe and the sleeve.

According to the present invention, the sleeve is not attached by being inserted into a guide pipe as in a conventional way; the sleeve is supported and positioned by a supporting portion which is provided in a protruding manner on an inner circumferential surface of a guide pipe. And when liquid chemical substances such as oils and solvents enter the connector, it is only in places where the supporting member is in contact with the sleeve that the chemical substances may be drawn in by the capillary phenomenon. Therefore, the phenomenon that the chemical substances adhere to the peripheral surface of the sleeve in a wide area and remain as in a conventional manner does not occur. That is, it is possible to suppress the occurrence of the problem that the transmittance and surface roughness of the sleeve worsen due to the adhesion and remaining of liquid chemical substances, resulting in a decrease in the optical function of the sleeve. It is possible to obtain an optical connector suitable as an optical connector which is required to provide chemical resistance and oil resistance, for example, in car-mounted applications.

BRIEF DESCRIPTION OF THE DRAWINGS

FIG. 2A is a front view showing the first embodiment of an optical connector of the present invention;

FIG. 2B is an EE sectional view of the optical connector of FIG. 2A;

FIG. 2C is an FF sectional view of the optical connector of FIG. 2A;

FIG. 5A is a front view showing the second embodiment of an optical connector of the present invention;

FIG. 5B is an EE sectional view of the optical connector of FIG. 5A;

FIG. 5C is an FF sectional view of the optical connector of FIG. 5A;

FIG. 8A is a front view showing the third embodiment of an optical connector of the present invention;

FIG. 8B is an EE sectional view of the optical connector of FIG. 8A;

FIG. 8C is an FF sectional view of the optical connector of FIG. 8A;

FIG. 10A is a front view showing the fourth embodiment of an optical connector of the present invention;

FIG. 10B is an EE sectional view of the optical connector of FIG. 10A;

FIG. 10C is an FF sectional view of the optical connector of FIG. 10A;

FIG. 12A is a front view showing the fifth embodiment of an optical connector of the present invention;

FIG. 12B is an EE sectional view of the optical connector of FIG. 12A;

FIG. 12C is an FF sectional view of the optical connector of FIG. 12A;

FIG. 16A is a front view showing the seventh embodiment of an optical connector of the present invention;

FIG. 16B is an EE sectional view of the optical connector of FIG. 16A;

FIG. 16C is an FF sectional view of the optical connector of FIG. 16A;

FIG. 18A is a front view showing the eighth embodiment of an optical connector of the present invention;

FIG. 18B is an EE sectional view of the optical connector of FIG. 18A;

FIG. 18C is an FF sectional view of the optical connector of FIG. 18A;

FIG. 22A is a front view showing the tenth embodiment of an optical connector of the present invention;

FIG. 22B is an EE sectional view of the optical connector of FIG. 22A;

FIG. 22C is an FF sectional view of the optical connector of FIG. 22A;

BEST MODES FOR CARRYING OUT THE INVENTION

Figure 1A:
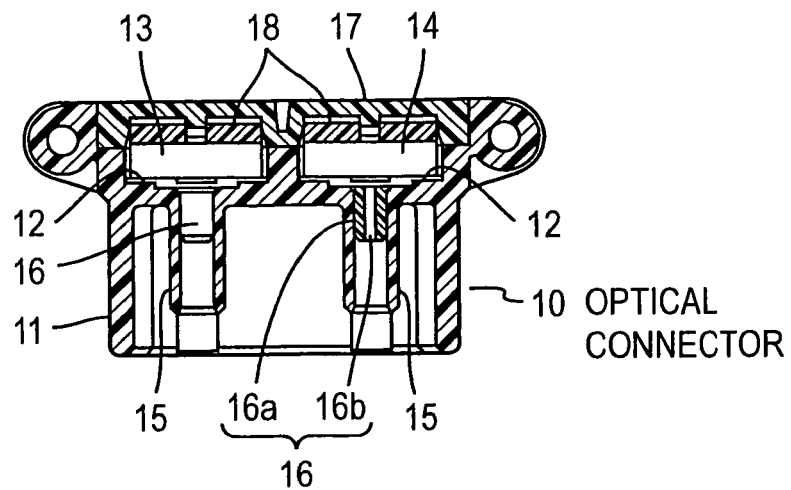
FIG. 1A is a sectional view showing an example of a conventional construction of an optical connector.
Figure 1B:
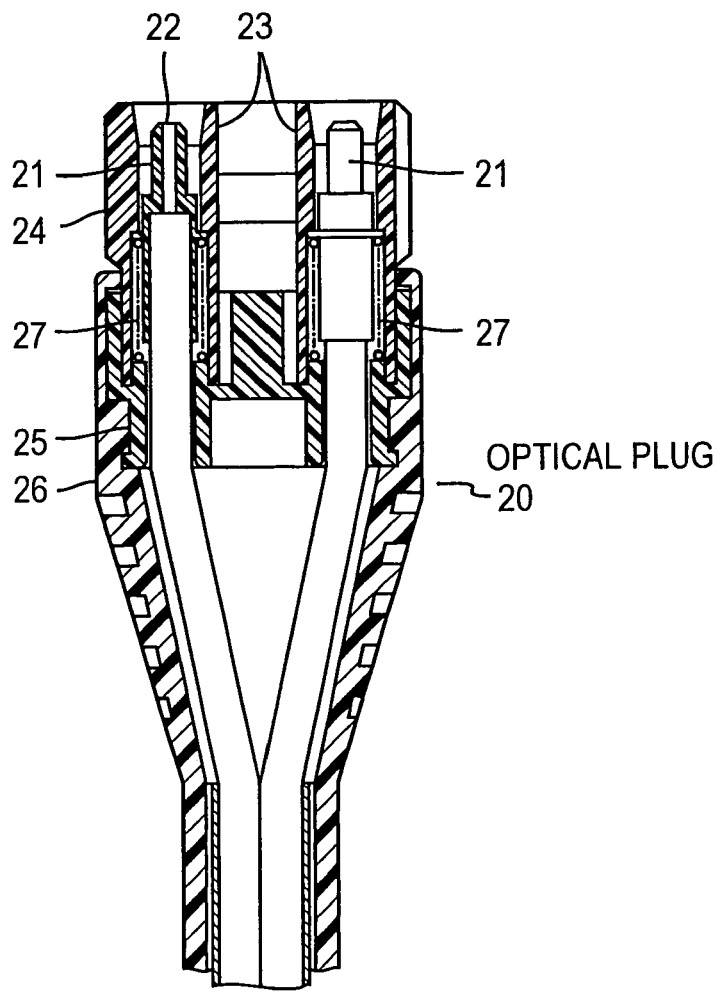
FIG. 1B is a sectional view showing the construction of an optical plug which is connected to the optical connector of FIG. 1A.

With reference to the accompanying drawings, how the present invention is to be carried out will be described by using embodiments.

Embodiment 1

FIGS. 2A, 2B and 2C are diagrams showing the shape of an optical connector of Embodiment 1. FIG. 2A is a diagram of the optical connector as viewed from the guide pipe 42 side. FIGS. 2B and 2C are sectional views of the optical connector. The optical connector of this embodiment is constituted by a connector body $40_1$, a light-emitting device module 31, a light-receiving device module 32, a device holder 33, a shield cover 34, and a pair of sleeves 35. The sleeves 35 are formed as one piece via a connection 36.

The light-emitting device module 31 and the light-receiving device module 32 each have such a construction that a light-emitting device and a light-receiving device are respectively resin encapsulated and a terminal is drawn out from the resin for encapsulation. The light-emitting device is, for example, a laser diode (LD), and the light-receiving device is, for example, a photodiode (PD). In FIGS. 2A and 2B, the reference numerals 31a, 32a each denote a terminal. The pair of sleeves 35 for sending and receiving has the shape of a circular cylinder, and the sleeve 35 and the connection 36 are integrally formed from resin.

Figure 3B:
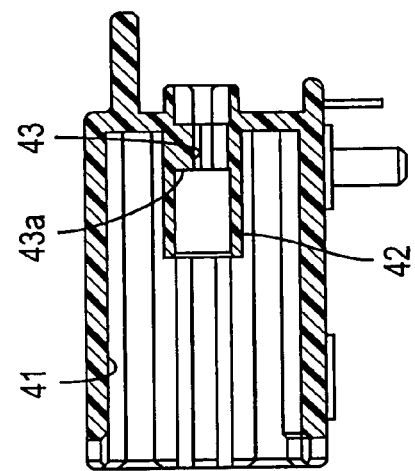
FIG. 3B is an EE sectional view of the optical connector of FIG. 3A.
Figure 3C:
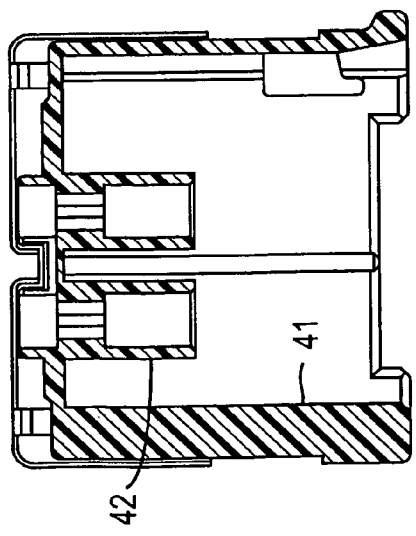
FIG. 3C is an FF sectional view of the optical connector of FIG. 3A.
Figure 3A:
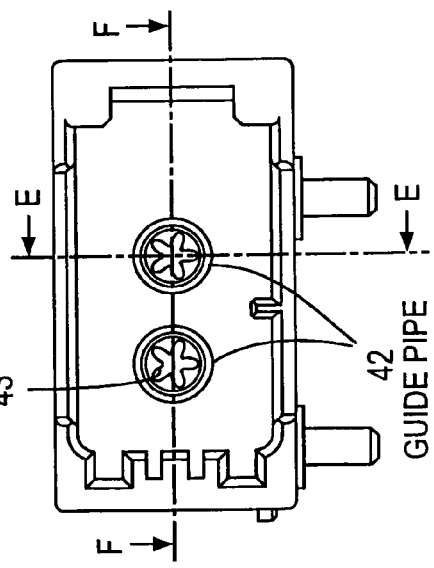
FIG. 3A is a front view showing the construction of a connector body of FIG. 2A.
Figure 4B:
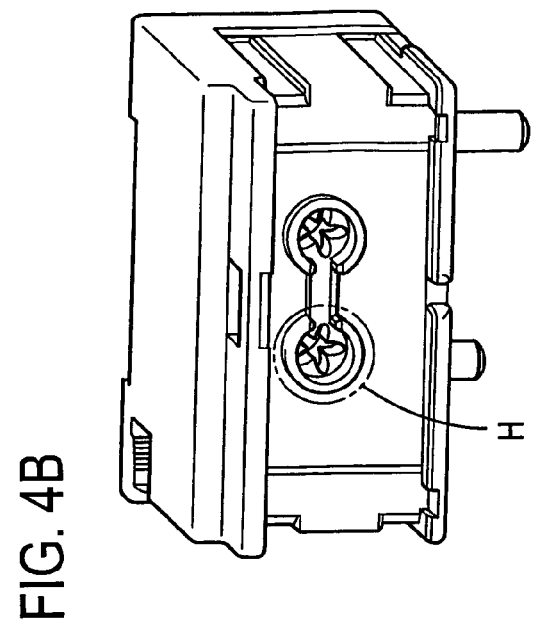
FIG. 4B is a perspective view of the connector body of FIG. 2A, as viewed from the back side.
Figure 4D:
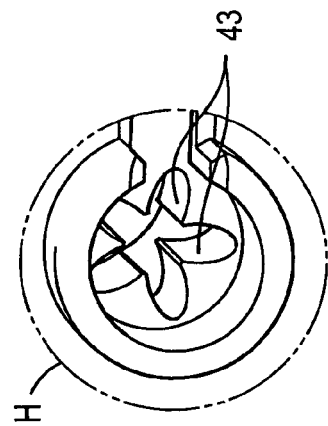
FIG. 4D is an enlarged view of part H of FIG. 4B.
Figure 4A:
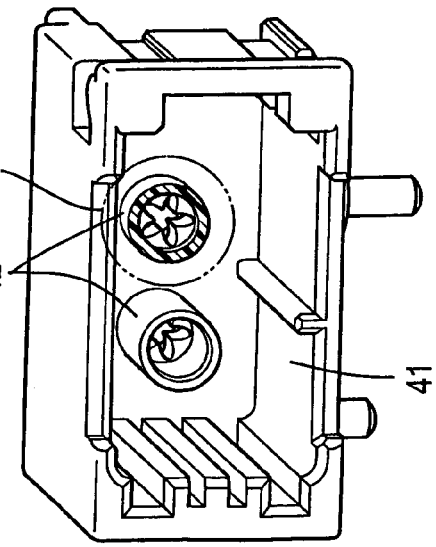
FIG. 4A is a perspective view of the connector body of FIG. 2A, the connector body being partially cut as viewed from the front side to obtain a section.
Figure 4C:
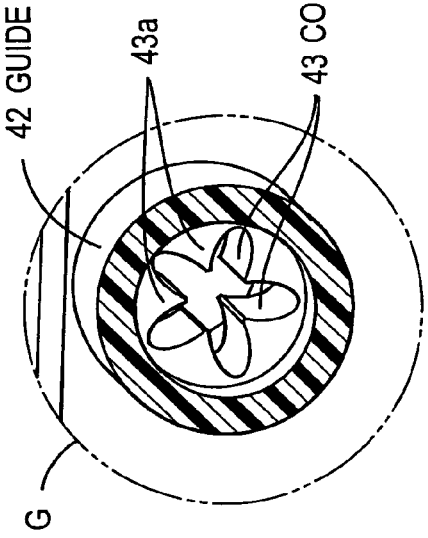
FIG. 4C is an enlarged view of part G of FIG. 4A.

FIGS. 3A, 3B and 3C are diagrams showing the shape of the connector body $40_1$. FIG. 3A is a diagram of the connector body $40_1$ as viewed from the guide pipe 42 side. FIGS. 3B and 3C are sectional views of the connector body $40_1$. The connector body $40_1$ is formed from resin and has a shape shown in FIGS. 3A, 3B and 3C and FIGS. 4A and 4B. Incidentally, FIG. 4A is a perspective view of the connector body $40_1$, the connector body being partially cut as viewed from the front side to obtain a section. FIG. 4B is a perspective view of the connector body $40_1$, as viewed from the back side. FIG. 4C shows details of part G of FIG. 4A. FIG. 4D shows details of part H of FIG. 4B.

A concavity 41 into which a mating optical plug is inserted is formed on a front surface of the connector body $40_1$. A pair of guide pipes 42, into which a ferrule attached to a terminal end of an optical fiber is inserted, is formed in a manner protruding from a bottom surface of this concavity 41. In the inner space of the guide pipe 42, the back side of the connector body $40_1$ is open. A supporting portion which supports and positions the sleeve 35 is formed in a protruding manner on the deep recess side (back side) of an inner circumferential surface of this guide pipe 42.

In this embodiment, the supporting portion is constituted by five convexities 43 which extend in the direction of an axis center of the guide pipe 42. The convexities 43 are arranged at equiangular intervals in the circumferential direction of the inner circumferential surface of the guide pipe 42. The leading end side of each of the convexities 43 facing the axis center of the guide pipe 42 has an acute-angled shape, and the leading end has a shape obtained by slightly cutting the acute-angled shape. Therefore, the area of contact surfaces between the convexity 43 and the sleeve 35 is very small. Incidentally, in this embodiment, wide portions of the convexities 43 on the base side (the side facing the inner circumferential surface of the guide pipe 2) are connected to each other. An end surface 43a of the convexity 43 on the front side (the side where the ferrule is inserted) is a ferrule abutment surface.

The sleeve 35 is attached to a portion where the convexity 43 is formed in the guide pipe 42 by being pressed into this portion. As a result of this, as shown in FIGS. 2A and 2B, the leading end of each of the convexities 43 comes into contact with the peripheral surface of the sleeve 35. And the sleeve 35 is supported and positioned by the convexities 43. A space 44 is formed in a portion where the sleeve 35 and the convexity 43 are not in contact with each other. This space 44 has a depth and a width enough for not drawing in liquid chemical substances at least by the capillary phenomenon.

The light-emitting device module 31, the light-receiving device module 32, the device holder 33, and the shield cover 34 are attached to the connector body $40_1$, to which the sleeve 35 has been attached. The light-emitting device module 31 and the light-receiving device module 32 are housed in the device holder 33 and held thereby, and this device holder 33 is housed in the shield cover 34 and held thereby. The shield cover 34 is attached to the connector body $40_1$ from the back side thereof, whereby the optical connector is completed. Incidentally, the shield cover 34 is fixed in such a manner that right and left engaging portions thereof (not seen in FIGS. 2A to 2C) are engaged to both side surfaces of the connector body $40_1$.

The pair of sleeves 35 is provided in such a manner that an end surface on the back side is opposed to a light-emitting surface of the light-emitting device module 31 and a light-receiving surface of the light-receiving device module 32. An end surface of the sleeve 35 on the front side is disposed in the same place as the end surface 43a of the convexity 43 on the front side, which is a ferrule abutment surface. An optical fiber which is inserted into the guide pipe 42 by being held by a ferrule, the light-emitting device module 31, and the light-receiving device module 32 are each optically connected by the sleeve 35 which is thus arranged.

In the optical connector having this construction, the sleeve 35 is supported and positioned by the leading ends of the five convexities 43. That is, the leading ends of the convexities 43 only slightly come into contact with the peripheral surface of the sleeve 35 and the space 44 is present in the greater part of the peripheral surface. Therefore, gaps into which liquid chemical substances may be drawn in by the capillary phenomenon are only small portions with which the leading ends of the convexities 43 are in contact. Accordingly, even when a liquid chemical substance enters the guide pipe 42, the amount of the liquid chemical substance which is drawn in by the capillary phenomenon and remains on the peripheral surface of the sleeve 35 is small. Therefore, it is possible to substantially suppress the occurrence of the phenomenon that the optical function of the sleeve 35 decreases due to the adherence of liquid chemical substances for a long period of time.

When a liquid chemical substance has entered the guide pipe 42, it is possible to wash away the chemical substance with streams of water and the like from the outside by utilizing the space 44. Also in this respect, it is possible to reduce the amount of a chemical substance adhering to the peripheral surface of the sleeve 35.

Incidentally, by giving an acute-angled shape to the leading end side of the convexity 43, it is possible to form the space 44 having sufficient dimensions (width and depth). Furthermore, by making the base side of the convexity 43 wide, it is possible to ensure the strength of the convexity 43.

The construction of the supporting portion which supports and positions the sleeve 35 is not limited to that of this embodiment, and it is possible to adopt various constructions. Other constructions of the supporting portion will be described below. Incidentally, in each of the embodiments given below, the constructions are shown by drawings similar to FIGS. 2A, 2B and 2C and FIGS. 4A and 4B of this embodiment. Like numerals refer to parts corresponding to those of FIGS. 2A, 2B and 2C and FIGS. 4A and 4B, and detailed descriptions of these parts are omitted.

In this embodiment, the description has been given of an optical connector which has both a light-emitting device and a light-receiving device and is provided with two sleeves. However, the present invention is not limited to this. The present invention can also be applied to an optical connector which has either a light-emitting device or a light-receiving device and is provided with only one sleeve.

Embodiment 2

Figure 6A:
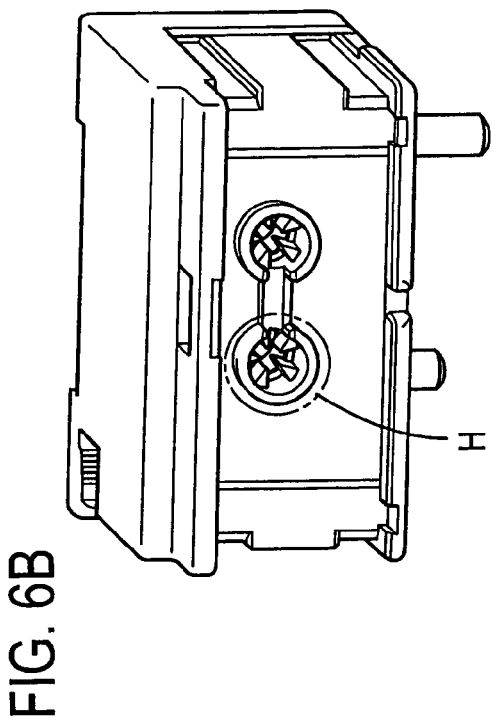
FIG. 6A is a perspective view of the connector body of FIG. 5A, the connector body being partially cut as viewed from the front side to obtain a section.
Figure 6B:
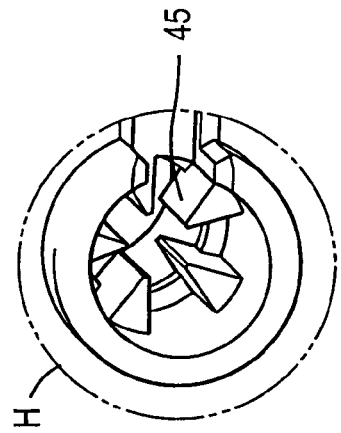
FIG. 6B is a perspective view of the connector body of FIG. 5A, as viewed from the back side.
Figure 6C:
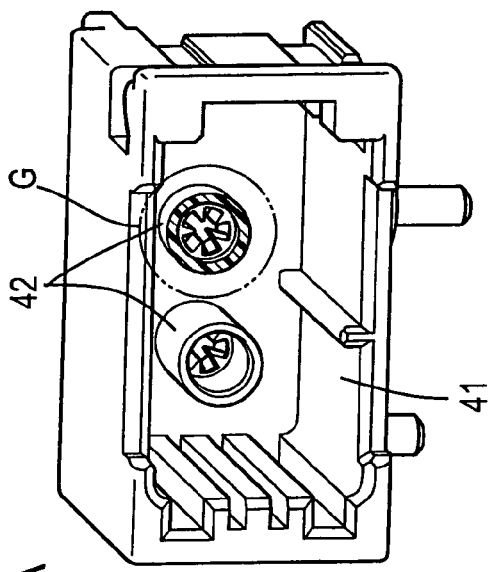
FIG. 6C is an enlarged view of part G of FIG. 6A.
Figure 6D:
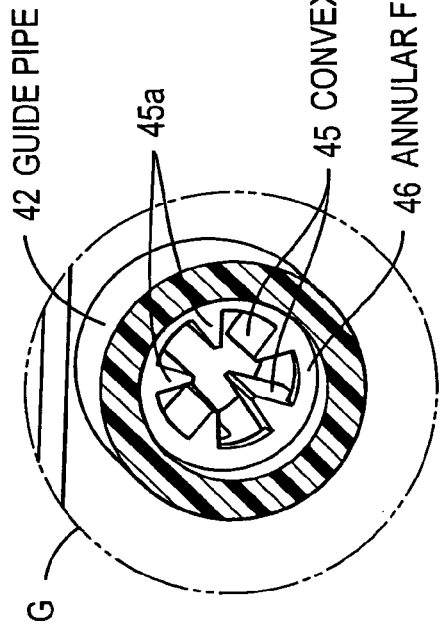
FIG. 6D is an enlarged view of part H of FIG. 6B.

FIGS. 5A, 4B and 5C and FIGS. 6A, 6B, 6C and 6D show the second embodiment of the present invention. FIGS. 5A, 5B and 5C show the construction of an optical connector, and FIGS. 6A, 6B, 6C and 6D show the construction of a connector body $40_2$ of the optical connector. FIG. 5A is a diagram of the optical connector as viewed from the guide pipe 42 side. FIGS. 5B and 5C are sectional views of the optical connector. FIG. 6A is a perspective view of the connector body $40_2$, the connector body being partially cut as viewed from the front side to obtain a section. FIG. 6B is a perspective view of the connector body $40_2$, as viewed from the back side. FIG. 6C shows details of part G of FIG. 6A. FIG. 6D shows details of part H of FIG. 6B.

In this embodiment, in the same way as in Embodiment 1, a supporting portion which supports and positions a sleeve 35 is constituted by five convexities 45. As with the convexities 43 of Embodiment 1, these convexities 45 have an acute-angled shape at the leading end side, part of the leading end of each convexity is cut, and the base side is wide. However, in the convexity 43, the inclined surface (side surface) from the leading end to the base is formed by a curved surface widening toward the base, whereas the inclined surface (side surface) of the convexity 45 is flat. That is, the convexity 45 has an acute-angled triangular shape in section.

Unlike the convexities 43, the convexities 45 are not connected to each other on the base side. The convexities 45 are formed on an inner circumferential surface of a guide pipe 42 independently of each other. An end surface 45a of the convexity 45 on the front side is a ferrule abutment surface. Furthermore, an annular ferrule stop 46 is formed on the inner circumferential surface of the guide pipe 42 so as to be flush with the end surface 45a (the leading end side of the convexity 45).

In the construction of this embodiment, as shown in FIG. 5A, a larger space 44 than that of Embodiment 1 can be ensured around the peripheral surface of the sleeve 35. In the construction of this embodiment, therefore, it is possible to reduce the adherence and remaining of liquid chemical substances to the sleeve 35 to a greater extent than in Embodiment 1 and adhering liquid chemical substances are more easily washed away. Incidentally, because of the provision of the annular ferrule stop 46 in the guide pipe 42, an inserted ferrule can be positioned satisfactorily and stably by this annular ferrule stop 46.

Figure 7A:
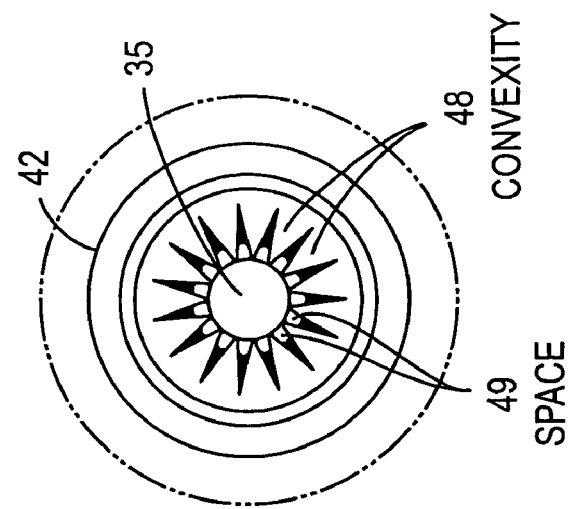
FIG. 7A is a diagram showing how a liquid chemical substance in the second embodiment remains.
Figure 7B:
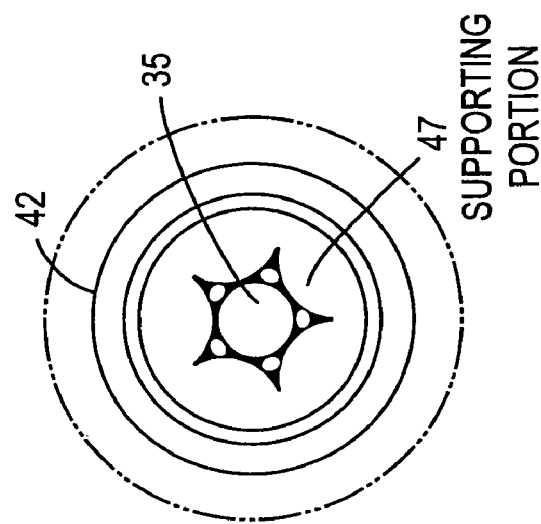
FIG. 7B is a diagram showing the construction of a comparative example.
Figure 7C:
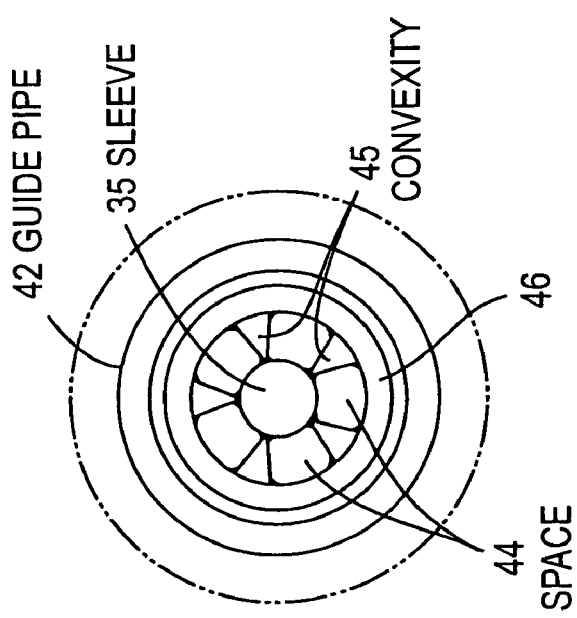
FIG. 7C is a diagram showing the construction of another comparative example.

FIGS. 7A, 7B and 7C show how a liquid chemical substance which has entered the guide pipe 42 remains in the guide pipe when the supporting method of the sleeve 35 is changed. FIG. 7A shows the construction of Embodiment 2, and FIGS. 7B and 7C each show constructions of comparative examples. In the figures, the black parts show places where the chemical substance remains.

In the case of the convexities 45 of FIG. 7A, the leading end of the convexity is narrow and the width and depth of the formed space 44 are large enough. Therefore, the amount of the remaining chemical substance is small.

In contrast to this, in the case of FIG. 7B, the leading end side of a supporting portion 47 does not have an acute-angled shape and the angle of contact with the peripheral surface of the sleeve 35 is large. In this case, as shown in the figure, the area in which the liquid chemical substance adheres to the sleeve 35 and remains therein becomes very large.

In FIG. 7C, the sleeve 35 is supported by convexities 48 the leading end of which has an acute-angled shape. However, because the number of the convexities 48 is large, the spaces 49 between the convexities 48 become narrow and it is impossible to obtain spaces which are sufficiently large. Also in this case, a large amount of the chemical substance remains between the convexities 48. Therefore, the forms of the supporting portions shown in FIGS. 7B and 7C are undesirable.

Embodiment 3

Figure 9B:
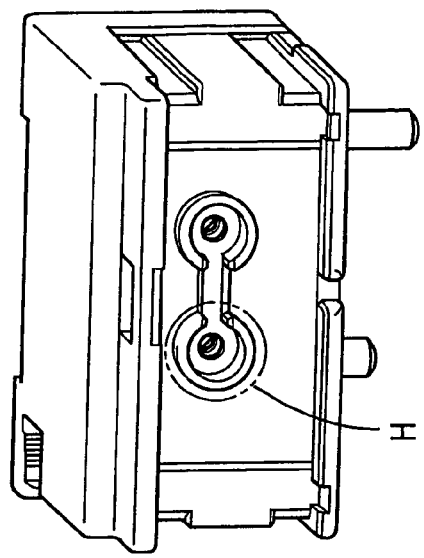
FIG. 9B is a perspective view of the connector body of FIG. 8A, as viewed from the back side.
Figure 9D:
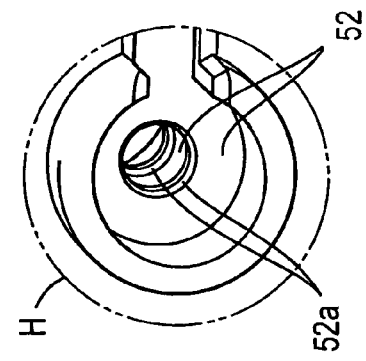
FIG. 9D is an enlarged view of part H of FIG. 9B.
Figure 9A:
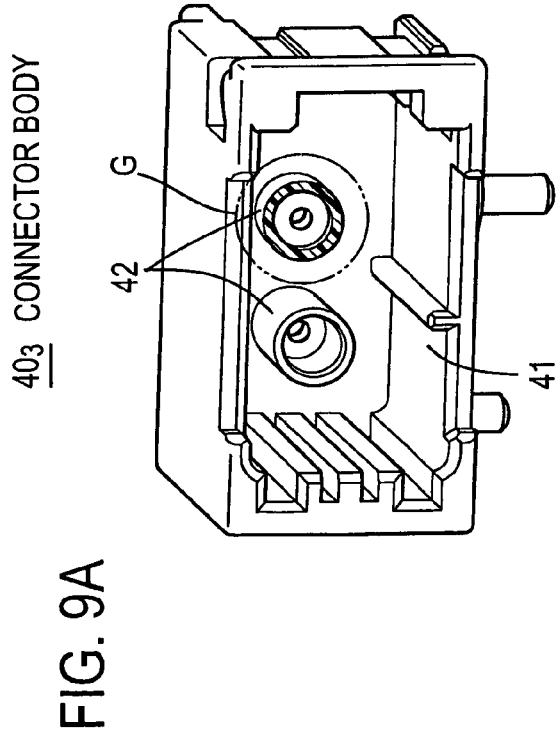
FIG. 9A is a perspective view of the connector body of FIG. 8A, the connector body being partially cut as viewed from the front side to obtain a section.
Figure 9C:
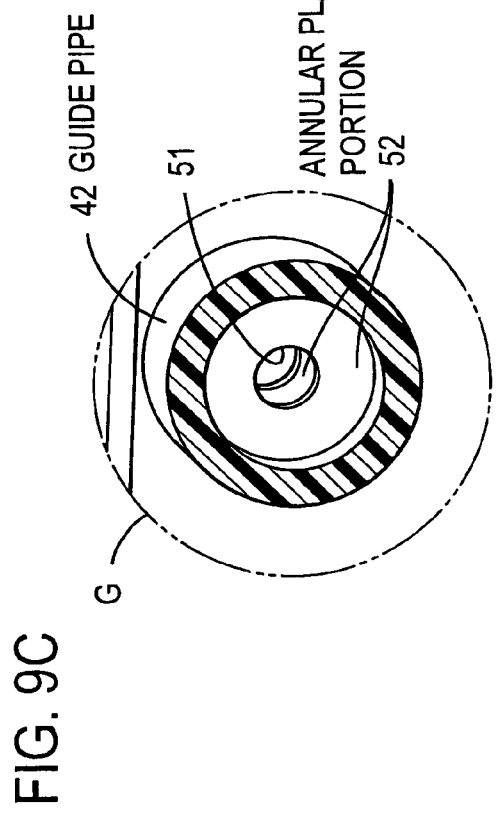
FIG. 9C is an enlarged view of part G of FIG. 9A.

FIGS. 8A, 8B and 8C show the construction of an optical connector of Embodiment 3. FIGS. 9A, 9B, 9C and 9D show the construction of a connector body $40_3$ of the optical connector. FIG. 8A is a diagram of the optical connector as viewed from the guide pipe 42 side. FIGS. 8B and 8C are sectional views of the optical connector. FIG. 9A is a perspective view of the connector body $40_3$, the connector body being partially cut as viewed from the front side to obtain a section. FIG. 9B is a perspective view of the connector body $40_3$, as viewed from the back side. FIG. 9C shows details of part G of FIG. 9A. FIG. 9D shows details of part H of FIG. 9B.

In this embodiment, as shown in FIG. 9C, an annular plate portion 52 having a hole 51 into which a sleeve 35 is fitted is formed in two places in the axial direction of a guide pipe 42. These annular plate portions 52 are supporting portions which support and position the sleeve 35.

The sleeve 35 is supported by being fitted into the holes 51 of the two annular plate portions 52. There is a large space 53 between the sleeve 35 and the guide pipe 42 in places other than the places where the sleeve 35 is supported by the annular plate portions 52. Incidentally, out of the two annular plate portions 52, the annular plate portion 52 which is positioned on the side where a ferrule is inserted (the front side) provides a ferrule abutment surface. Around the hole 51 on the back side of each of the annular plate portions 52, there is formed a guiding chamfer (tapered surface) 52a so that the sleeve 45 is easily inserted.

Even in the case of a construction in which the sleeve 35 is supported and positioned by such annular plate portions 52, the area in which supporting portions are in contact with the peripheral surface of the sleeve 35 is small. Therefore, even when a liquid chemical substance has entered the guide pipe 42, it is possible to ensure that the amount of the liquid chemical substance which adheres to the peripheral surface of the sleeve 35 due to the capillary phenomenon and remains therein is small.

Embodiment 4

Figure 11A:
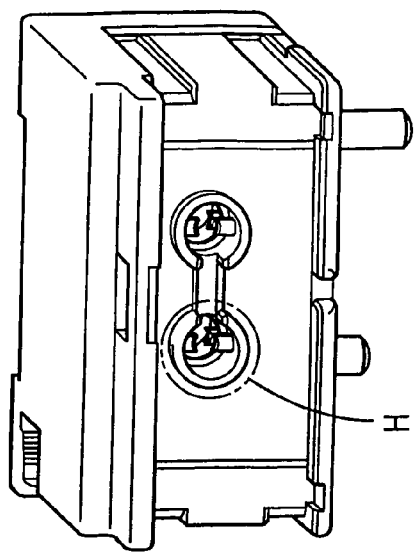
FIG. 11A is a perspective view of the connector body of FIG. 10A, the connector body being partially cut as viewed from the front side to obtain a section.
Figure 11B:
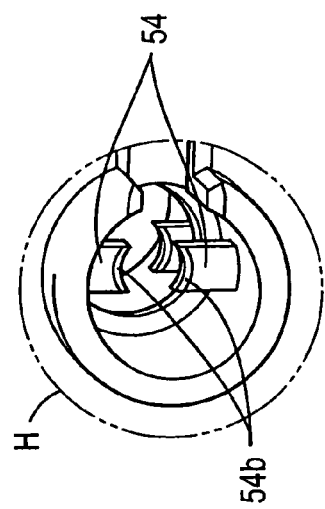
FIG. 11B is a perspective view of the connector body of FIG. 10A, as viewed from the back side.
Figure 11C:
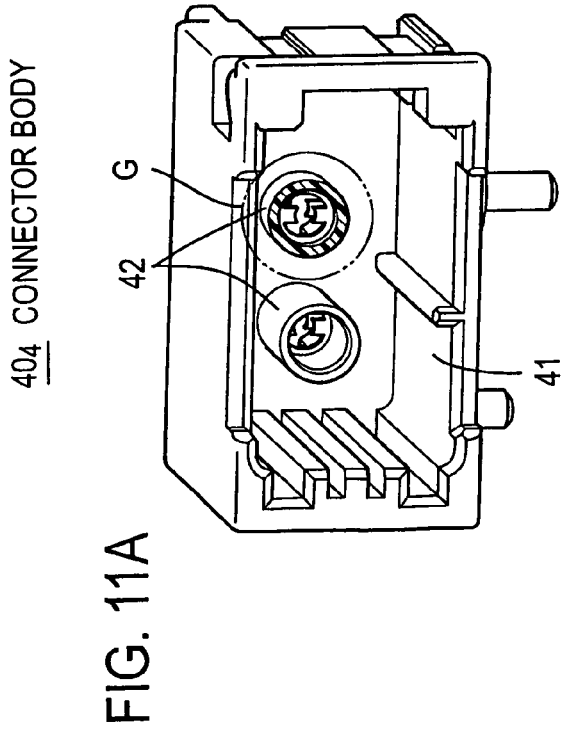
FIG. 11C is an enlarged view of part G of FIG. 11A.
Figure 11D:
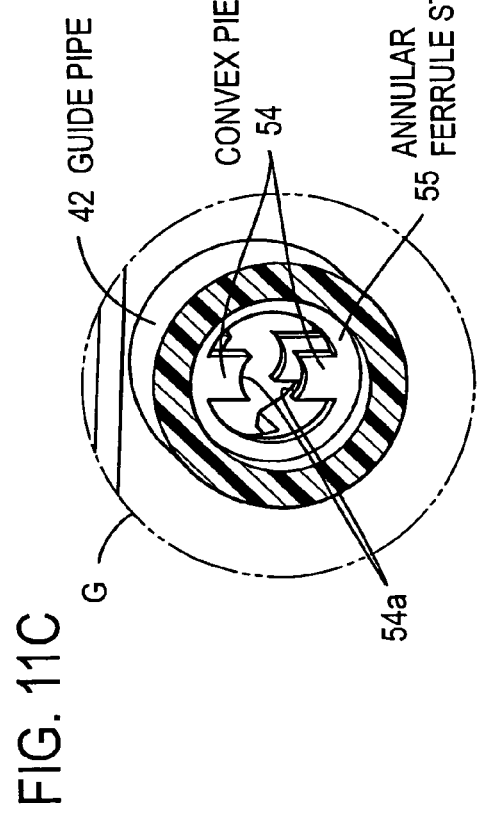
FIG. 11D is an enlarged view of part H of FIG. 11B.

FIGS. 10, 10B and 10C show the construction of an optical connector of Embodiment 4. FIGS. 11A, 11B, 11C and 11D show the construction of a connector body $40_4$ of the optical connector. FIG. 10A is a diagram of the optical connector as viewed from the guide pipe 42 side. FIGS. 10B and 10C are sectional views of the optical connector. FIG. 11A is a perspective view of the connector body $40_4$, the connector body being partially cut as viewed from the front side to obtain a section. FIG. 11B is a perspective view of the connector body $40_4$, as viewed from the back side. FIG. 11C shows details of part G of FIG. 11A. FIG. 11D shows details of part H of FIG. 11B.

In this embodiment, a convex piece 54 is provided in place of the annular plate portion 52 of Embodiment 3. As shown in FIGS. 11C and 11D, the convex piece 54 is provided in two places in the axial direction of a guide pipe 42 so as to radially form a pair in each place. The convex pieces 54 in both places are provided in the same angular position in the circumferential direction. That is, as viewed from the axial direction, the convex pieces 54 in the two places are provided in places which overlap each other. Incidentally, the portion (leading end) of the convex piece 54 which is in contact with a sleeve 35 has a shape which is contoured along a peripheral surface of the sleeve 35. That is, this portion has a concave shape.

Out of the convex pieces 54 in the two places, the pair of convex pieces 54 present in the front side provides a ferrule abutment surface. In this example, an annular ferrule stop 55 is formed in the guide pipe 42 which is flush with the ferrule abutment surface. Incidentally, a chamfer 54b is formed at the leading end of each of the convex pieces 54 on the back side.

By being inserted into a gap between the convex pieces 54 which radially form a pair, the sleeve 35 is supported in a sandwiched manner and positioned by the convex pieces 54. In the case of this embodiment, a supporting portion does not have a construction in which the guide pipe 42 is covered and, therefore, a space 53 is open to the outside. Therefore, even when a liquid chemical substance has adhered to the peripheral surface of the sleeve 35, the optical connector is easily cleaned.

Embodiment 5

Figure 13A:
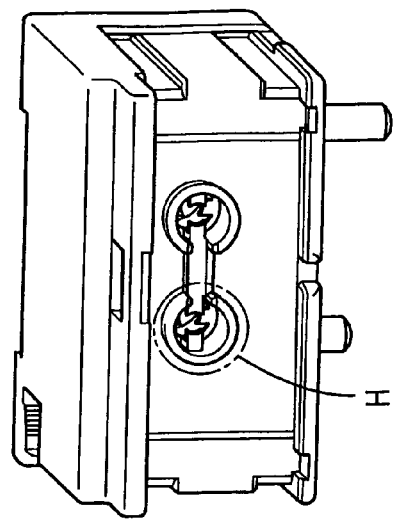
FIG. 13A is a perspective view of the connector body of FIG. 12A, the connector body being partially cut as viewed from the front side to obtain a section.
Figure 13B:
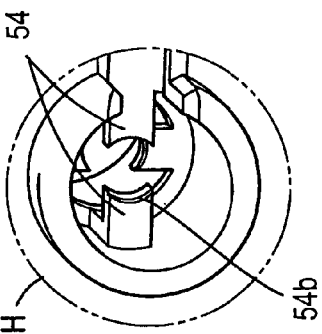
FIG. 13B is a perspective view of the connector body of FIG. 12A, as viewed from the back side.
Figure 13C:
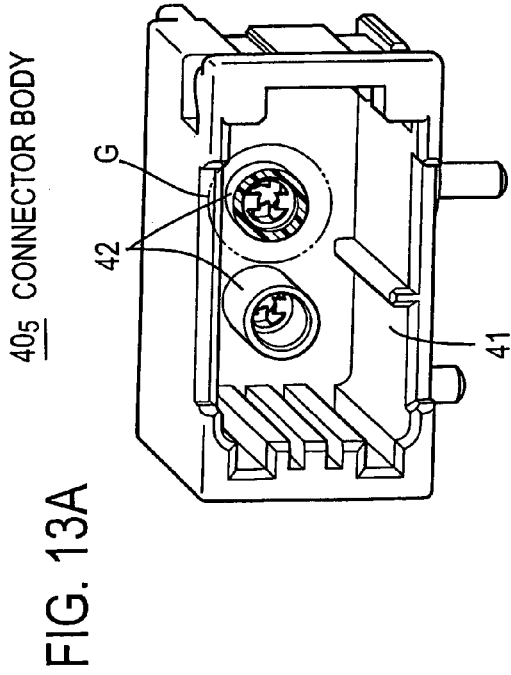
FIG. 13C is an enlarged view of part G of FIG. 13A.
Figure 13D:
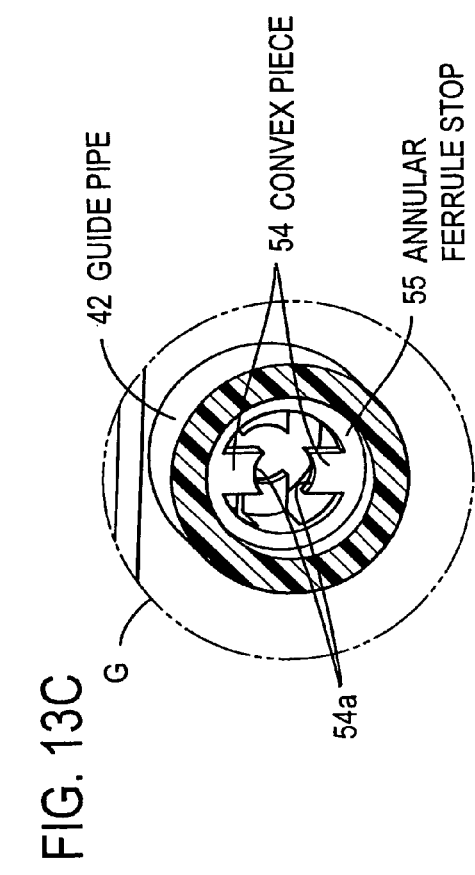
FIG. 13D is an enlarged view of part H of FIG. 13B.

FIGS. 12A, 12B and 12C show the construction of an optical connector of Embodiment 5. FIGS. 13A, 13B, 13C and 13D show the construction of a connector body $40_5$ of the optical connector. FIG. 12A is a diagram of the optical connector as viewed from the guide pipe 42 side. FIGS. 12B and 12C are sectional views of the optical connector. FIG. 13A is a perspective view of the connector body $40_5$, the connector body being partially cut as viewed from the front side to obtain a section. FIG. 13B is a perspective view of the connector body $40_5$, as viewed from the back side. FIG. 13C shows details of part G of FIG. 13A. FIG. 13D shows details of part H of FIG. 13B.

In this embodiment, as shown in FIGS. 13C and 13D, the positions of convex pieces 54 in two places have circumferential angles which are different from each other. That is, as viewed from the axial direction, the convex pieces 54 in the two places do not overlap each other. By adopting this construction, undercuts can be avoided and it is possible to mold the connector body $40_5$ by use of a simple and inexpensive die. Therefore, in the case of this embodiment, an inexpensive optical connector is easily obtained.

Embodiment 6

Figure 14B:
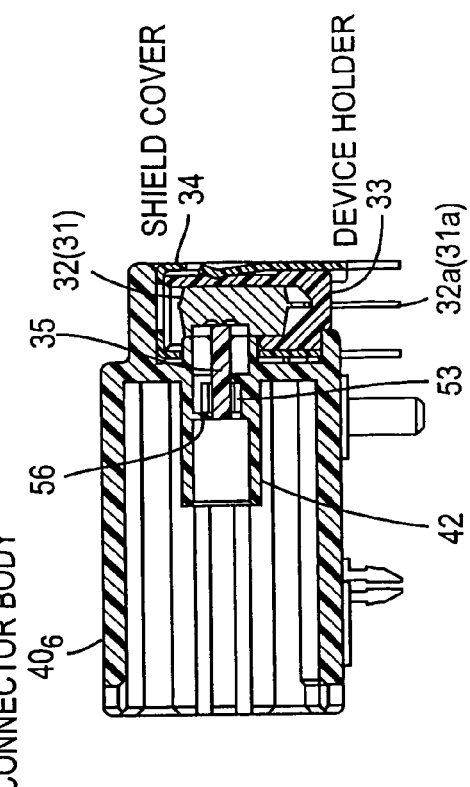
FIG. 14B is an EE sectional view of the optical connector of FIG. 14A.
Figure 14C:
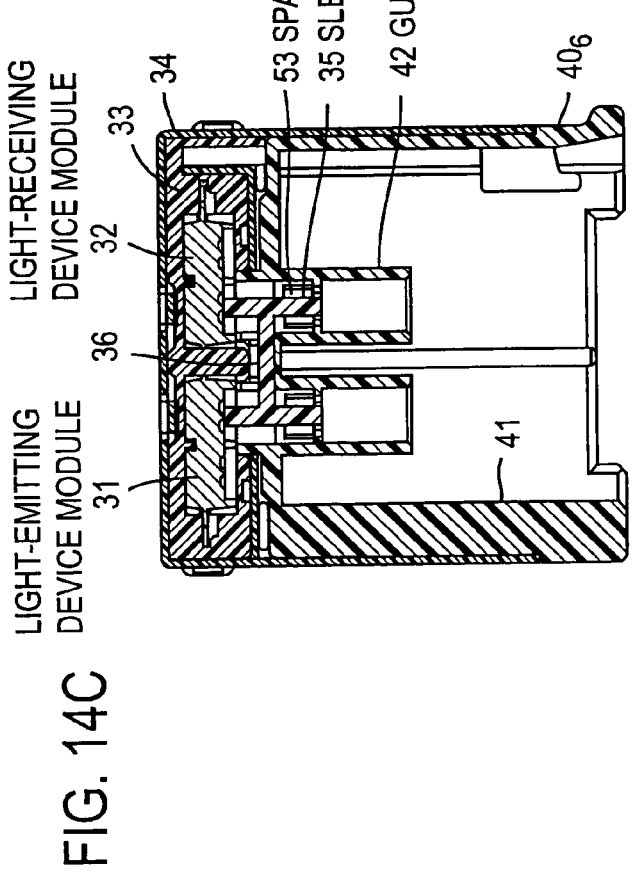
FIG. 14C is an FF sectional view of the optical connector of FIG. 14A.
Figure 14A:
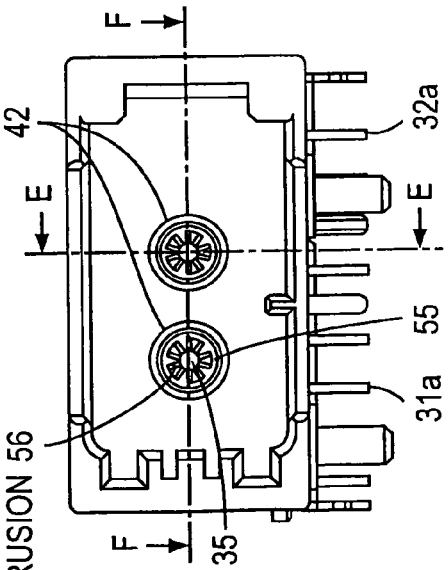
FIG. 14A is a front view showing the sixth embodiment of an optical connector of the present invention.
Figure 15B:
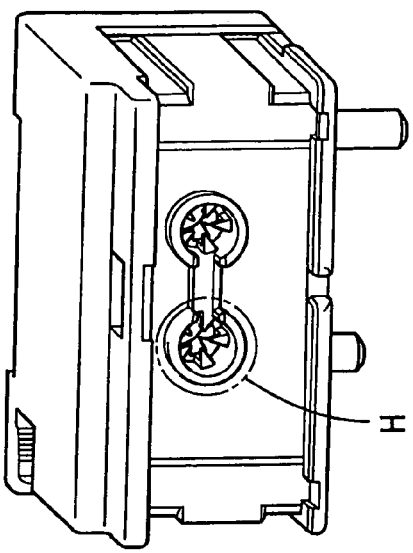
FIG. 15B is a perspective view of the connector body of FIG. 14A, as viewed from the back side.
Figure 15D:
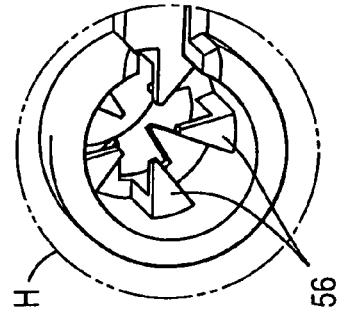
FIG. 15D is an enlarged view of part H of FIG. 15B.
Figure 15A:
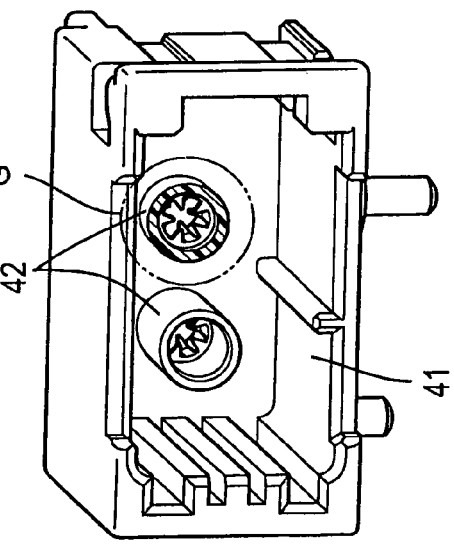
FIG. 15A is a perspective view of the connector body of FIG. 14A, the connector body being partially cut as viewed from the front side to obtain a section.
Figure 15C:
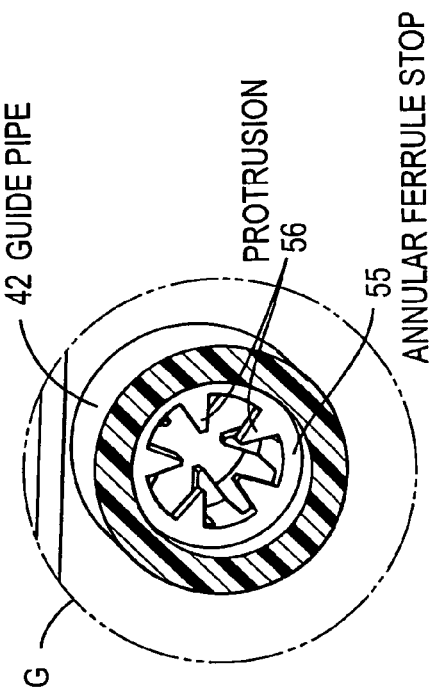
FIG. 15C is an enlarged view of part G of FIG. 15A.

FIGS. 14A, 14B and 14C show the construction of an optical connector of Embodiment 6. FIGS. 15A, 15B, 15C and 15D show the construction of a connector body $40_6$ of the optical connector. FIG. 14A is a diagram of the optical connector as viewed from the guide pipe 42 side. FIGS. 14B and 14C are sectional views of the optical connector. FIG. 15A is a perspective view of the connector body $40_6$, the connector body being partially cut as viewed from the front side to obtain a section. FIG. 15B is a perspective view of the connector body $40_6$, as viewed from the back side. FIG. 15C shows details of part G of FIG. 15A. FIG. 15D shows details of part H of FIG. 15B.

In this embodiment, as shown in FIGS. 15C and 15D, five protrusions 56 are circumferentially provided at equiangular intervals in two places in the axial direction within a guide pipe 42. The protrusions 56 are supporting portions which support and position a sleeve 35. Also, the protrusion 56 has a triangle shape with an acute angle at its tip and the tip is slightly cut.

Out of the protrusion 56 in the two places, the protrusion 56 on the front side constitutes a ferrule abutment surface. In this embodiment, an annular ferrule stop 55 is also provided. Incidentally, the five protrusions 56 present in the two fore-and-aft places are arranged so that they do not overlap each other as viewed from the axial direction.

The sleeve 35 is inserted into the parts in the guide pipe 42 where the protrusions 56 are formed and the sleeve 35 is supported and positioned by being pinched between the leading ends of the protrusions 56.

Embodiment 7

Figure 17A:
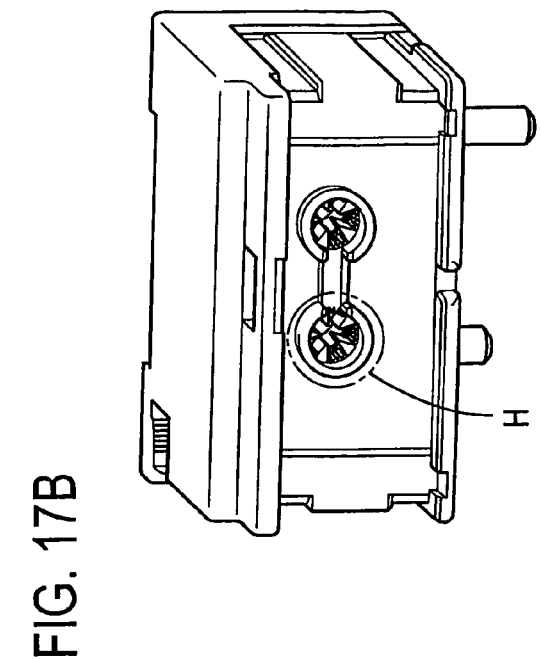
FIG. 17A is a perspective view of the connector body of FIG. 16A, the connector body being partially cut as viewed from the front side to obtain a section.
Figure 17B:
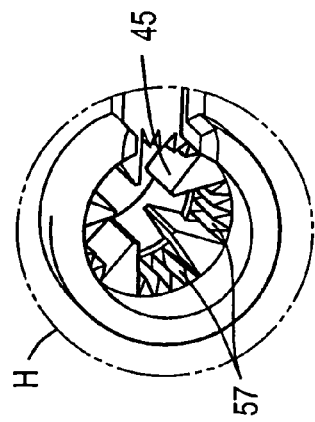
FIG. 17B is a perspective view of the connector body of FIG. 16A, as viewed from the back side.
Figure 17C:
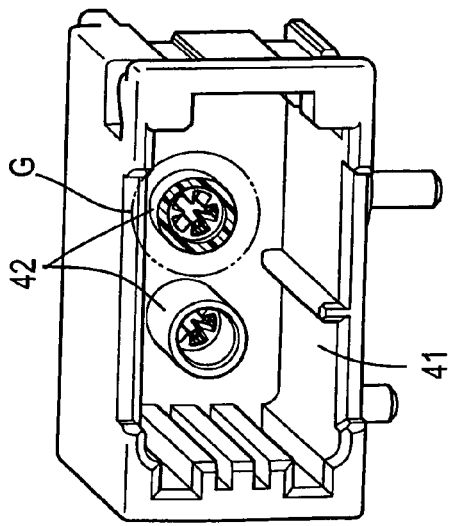
FIG. 17C is an enlarged view of part G of FIG. 17A.
Figure 17D:
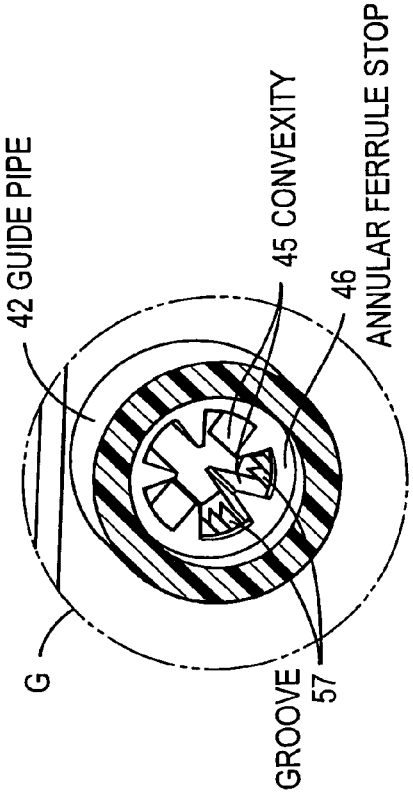
FIG. 17D is an enlarged view of part H of FIG. 17B.

FIGS. 16A, 16B and 16C show the construction of an optical connector of Embodiment 7. FIGS. 17A, 17B, 17C and 17D show the construction of a connector body $40_7$ of the connector. FIG. 16A is a diagram of the optical connector as viewed from the guide pipe 42 side. FIGS. 16B and 16C are sectional views of the optical connector. FIG. 17A is a perspective view of the connector body $40_7$, the connector body being partially cut as viewed from the front side to obtain a section. FIG. 17B is a perspective view of the connector body $40_7$, as viewed from the back side. FIG. 17C shows details of part G of FIG. 17A. FIG. 17D shows details of part H of FIG. 17B.

This embodiment is an example in which a groove is added between the convexities 45 within the guide pipe 42 of Embodiment 2. As shown in FIGS. 17C and 17D, a fine groove 57 is formed between convexities 45 within a guide pipe 42.

In this embodiment, places where a liquid chemical substance is drawn in by the capillary phenomenon are intentionally provided by the fine grooves 57 and these places are limited. By thus forming the fine grooves 57 on the inner circumferential surface of the guide pipe 42 away from a sleeve 35, it is possible to minimize the amount of a liquid chemical substance remaining on the peripheral surface of the sleeve 35.

Embodiment 8

Figure 19A:
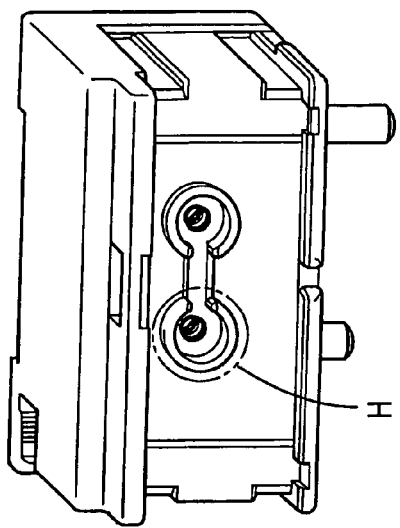
FIG. 19A is a perspective view of the connector body of FIG. 18A, as viewed from the front side.
Figure 19B:
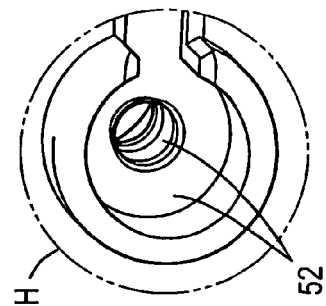
FIG. 19B is a perspective view of the connector body of FIG. 18A, as viewed from the back side.
Figure 19C:
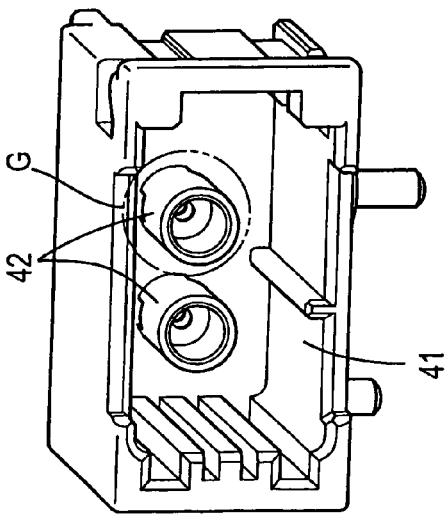
FIG. 19C is an enlarged view of part G of FIG. 19A.
Figure 19D:
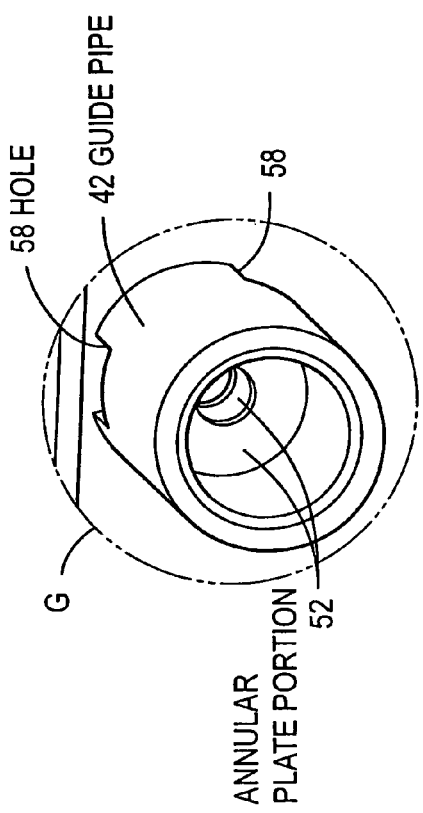
FIG. 19D is an enlarged view of part H of FIG. 19B.

FIGS. 18A, 18B and 18C show the construction of an optical connector of Embodiment 8. FIGS. 19A, 19B, 19C and 19D show the construction of a connector body $40_8$ of the connector. FIG. 18A is a diagram of the optical connector as viewed from the guide pipe 42 side. FIGS. 18B and 18C are sectional views of the optical connector. FIG. 19A is a perspective view of the connector body $40_8$, as viewed from the front side. FIG. 19B is a perspective view of the connector body $40_7$, as viewed from the back side. FIG. 19C shows details of part G of FIG. 19A. FIG. 19D shows details of part H of FIG. 19B.

This embodiment is an example in which a hole 58 as shown in FIG. 19C is formed in the guide pipe 42 of Embodiment 3. The hole 58 is provided in three places of each guide pipe 42 so as to be open in the portion where the sleeve 35 is positioned. That is, the hole 58 is provided so as to open a space 53 to the outside.

By thus providing the hole 58 in the guide pipe 42, even when a liquid chemical substance has entered the guide pipe 42, the cleaning of the optical connector can be satisfactorily performed.

Embodiment 9

Figure 20B:
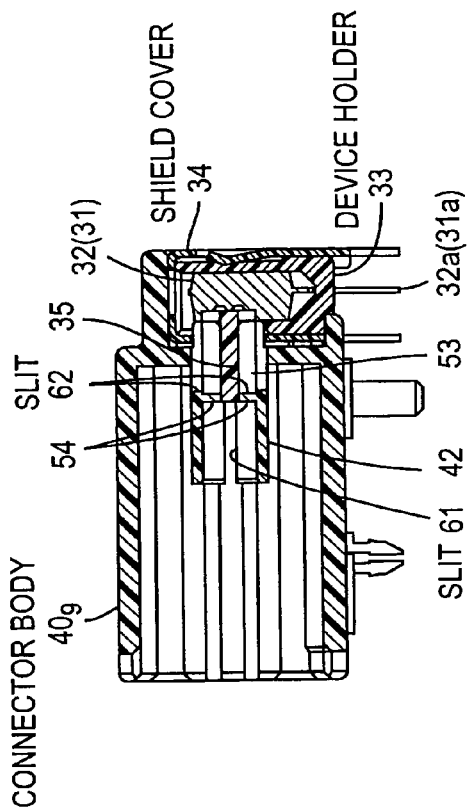
FIG. 20B is an EE sectional view of the optical connector of FIG. 20A.
Figure 20C:
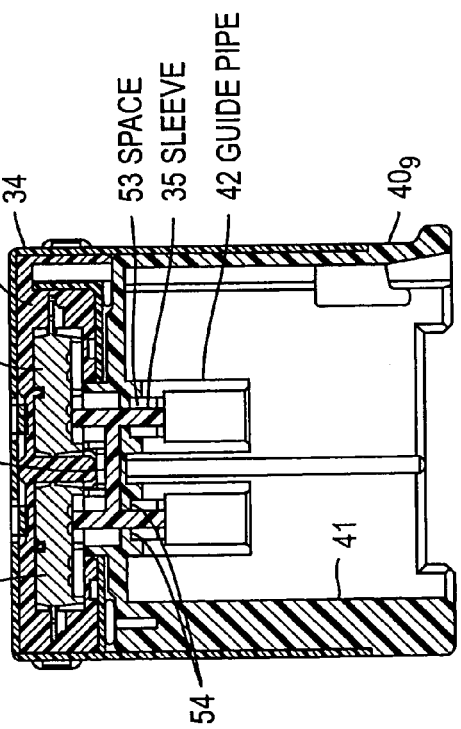
FIG. 20C is an FF sectional view of the optical connector of FIG. 20A.
Figure 20A:
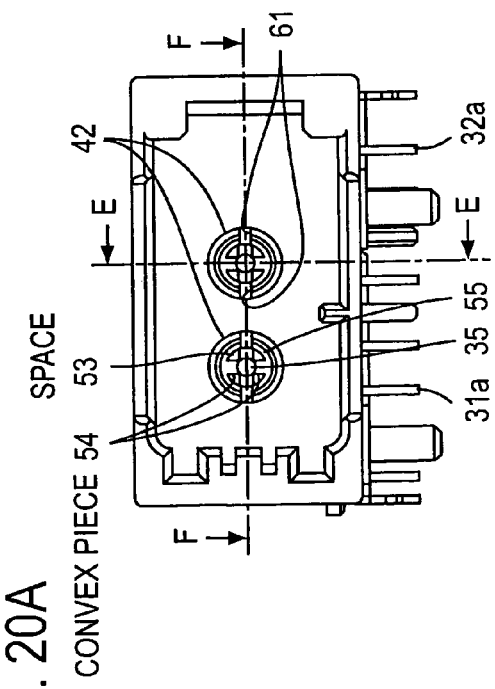
FIG. 20A is a front view showing the ninth embodiment of an optical connector of the present invention.
Figure 21A:
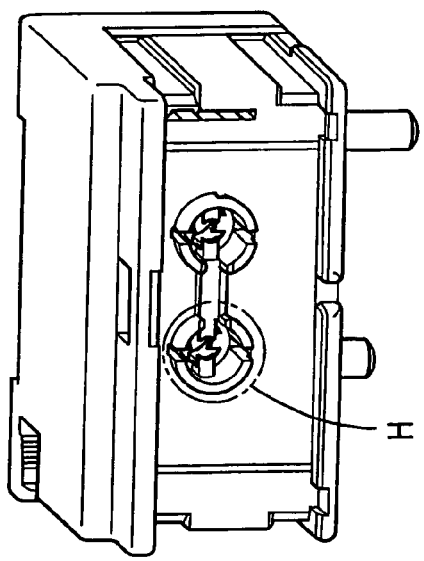
FIG. 21A is a perspective view of the connector body of FIG. 20A, as viewed from the front side.
Figure 21B:
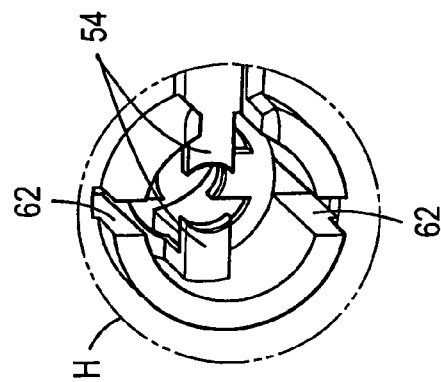
FIG. 21B is a perspective view of the connector body of FIG. 20A, as viewed from the back side.
Figure 21C:
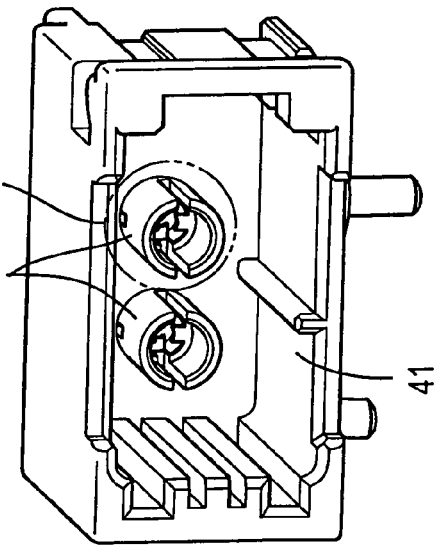
FIG. 21C is an enlarged view of part G of FIG. 21A.
Figure 21D:
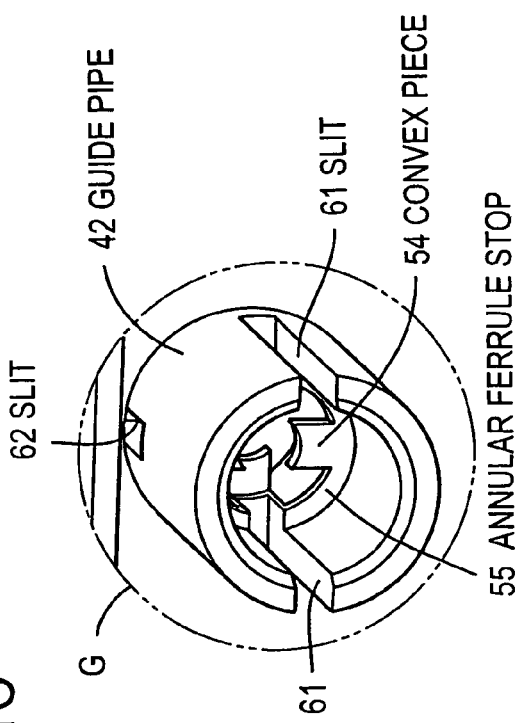
FIG. 21D is an enlarged view of part H of FIG. 21B.

FIGS. 20A, 20B and 20C show the construction of an optical connector of Embodiment 9. FIGS. 21A, 21B, 21C and 21D show the construction of a connector body $40_9$ of the connector. FIG. 20A is a diagram of the optical connector as viewed from the guide pipe 42 side. FIGS. 20B and 20C are sectional views of the optical connector. FIG. 21A is a perspective view of the connector body $40_9$, as viewed from the front side. FIG. 21B is a perspective view of the connector body $40_9$, as viewed from the back side. FIG. 21C shows details of part G of FIG. 21A. FIG. 21D shows details of part H of FIG. 21B.

In this embodiment, slits 61, 62 shown in FIG. 21D are formed in the guide pipe 42 of Embodiment 5. The slit 61 is notched from the leading end of the guide pipe to a space 53. The slit 61 is formed in two places in the radial direction. The slit 62 is notched from the tailing end side of the guide pipe 42 (the back side of the connector body $40_9$) to a space 53. The slit 62 is provided in two places orthogonal to the position of the slit 61.

Although in Embodiment 8 the hole 58 is provided in the guide pipe, such slits 61, 62 may be provided. As a result of this, the cleaning of the optical connector can be more easily performed and the cleaning can be efficiently performed.

Embodiment 10

Figure 23A:
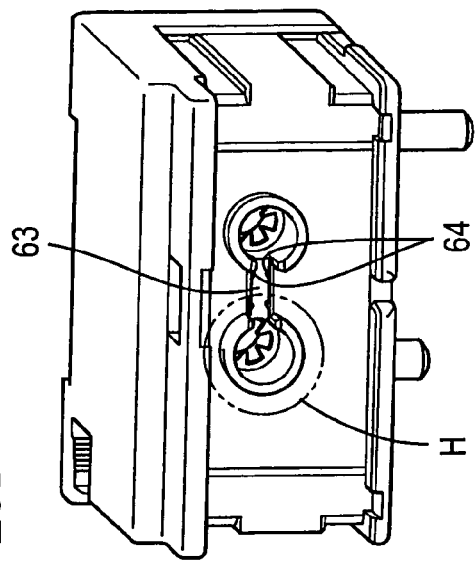
FIG. 23A is a perspective view of the connector body of FIG. 22A, the connector body being partially cut as viewed from the front side to obtain a section.
Figure 23B:
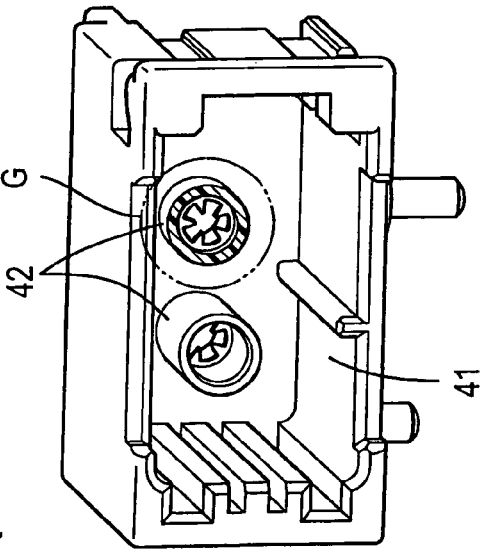
FIG. 23B is a perspective view of the connector body of FIG. 22A, as viewed from the back side.
Figure 23C:
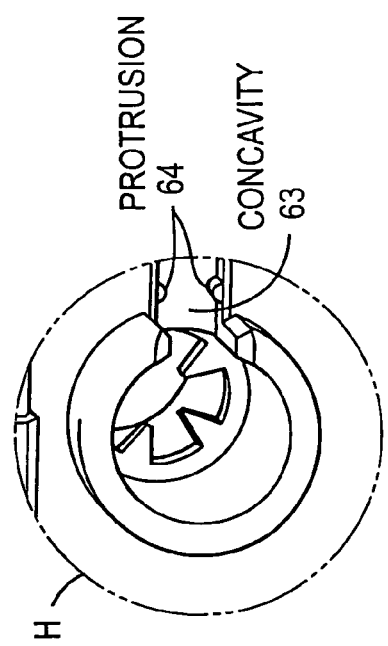
FIG. 23C is an enlarged view of part G of FIG. 23A.
Figure 23D:
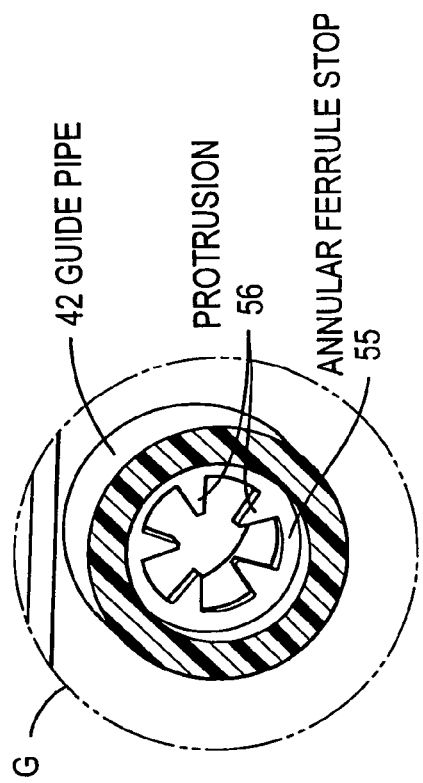
FIG. 23D is an enlarged view of part H of FIG. 23B.

FIGS. 22A, 22B and 22C show the construction of an optical connector of Embodiment 10. FIGS. 23A, 23B, 23C and 23D show the construction of a connector body $40_{10}$ of the connector. FIG. 22A is a diagram of the optical connector as viewed from the guide pipe 42 side. FIGS. 22B and 22C are sectional views of the optical connector. FIG. 23A is a perspective view of the connector body $40_{10}$, the connector body being partially cut as viewed from the front side to obtain a section. FIG. 23B is a perspective view of the connector body $40_{10}$, as viewed from the back side. FIG. 23C shows details of part G of FIG. 23A. FIG. 23D shows details of part H of FIG. 23B.

In the guide pipe 42 of Embodiment 6, the five protrusions 56 are provided in each of the two places in the axial direction. In this embodiment, the five protrusions 56 on the back side are eliminated so that the supporting portion of the guide pipe 42 is provided only in one place. And the connector body $40_{10}$ supports and positions a connection 36 which connects the two sleeves 35.

As shown in FIGS. 23B and 23D, a concavity 63 which houses the connection 36 is formed on the back surface of the connector body $40_{10}$. Also upon a side wall surface of this concavity 63, a small protrusion 64 is formed. This protrusion 64 is provided in quantities of two, each in an upper edge portion and a lower edge portion of the concavity 63.

The connection 36 is attached to the concavity 63 having the protrusions 64 by being pressed therein. And the four protrusions 64 fix and position the connection 36.

In this embodiment, the supporting portion which comes into contact with the sleeve 35 is only in one place at the leading end of the sleeve 35. Therefore, the number of places where a liquid chemical substance adheres and remains can be further reduced. Incidentally, if a liquid chemical substance adheres to the portion which fixes the connection 36, no problem arises because the connection 36 does not relate to the optical function.

The present invention has been described above by using the various embodiments. Conventional techniques had the problem that due to contact of the whole peripheral surface of a sleeve with a guide pipe, liquid chemical substances are drawn in by the capillary phenomenon. According to the present invention, a sleeve is supported and positioned by supporting portions, such as convexities, annular plate portions, convex pieces and protrusions in the guide pipe. Therefore, because it is possible to reduce the area of contact of the supporting portions with the sleeve, it is possible to substantially reduce the amount of a liquid chemical substance which is drawn in by the capillary phenomenon and remains.

Incidentally, although in Embodiments 1 and 2 five convexities 43, 45 are respectively provided, the number of the convexities is not limited to five and it is necessary only that at least three convexities be provided. The sleeve 35 can be positioned and supported by providing three convexities. Similarly, in Embodiment 6, five protrusions 56 are provided each in two places of the guide pipe 42 in the axial direction. However, it is necessary only that also this protrusion 1 be provided in quantities of at least three in one place.

In Embodiments 3 to 6, supporting portions, such as the annular plate portions 52, the convex pieces 54 and the protrusions 56, are provided each in two places in the axial direction of the guide pipe 42. However, such supporting portions are not limited to two places and may be provided in three or more places in the axial direction of the guide pipe 42.

Although the leading end of the convexities 43, 45 in Embodiments 1 and 2 and the leading end of the protrusions 56 in Embodiment 6 are each cut a little, it is also possible that the leading ends have an acute-angled shape without being cut.

What is claimed is:

1. An optical connector that is connected to an optical plug holding an optical fiber to a terminal end of which a ferrule is attached, comprising:
    a light-emitting device or a light-receiving device;
    a sleeve which optically connects the light-emitting device or the light-receiving device and the optical fiber; and
    a guide pipe which positions the sleeve and has a supporting portion on an inner circumferential surface thereof so that a space is formed between the guide pipe and the sleeve, wherein the supporting portion is provided in at least two places in an axial direction of the guide pipe and in each of the places there is provided a pair of acute-angled convex pieces which has a shape contoured along a peripheral surface of the sleeve and pinches the sleeve, and the convex piece present on a side where the ferrule is inserted is a ferrule abutment surface and has also an annular ferrule stop flush with the ferrule abutment surface.

2. An optical connector that is connected to an optical plug holding an optical fiber to a terminal end of which a ferrule is attached, comprising:
    a light-emitting device or a light-receiving device;
    a sleeve which optically connects the light-emitting device or the light-receiving device and the optical fiber; and
    a guide pipe which positions the sleeve and has a supporting portion on an inner circumferential surface thereof so that a space is formed between the guide pipe and the sleeve, wherein the supporting portion is provided in at least two places in the axial direction of the guide pipe and in each of the places there are at least three acute-angled protrusions which pinch the sleeve, and the protrusion on a side where the ferrule is inserted is a ferrule abutment surface and has also an annular ferrule stop flush with the ferrule abutment surface.

3. An optical connector that is connected to an optical plug holding an optical fiber to a terminal end of which a ferrule is attached, comprising:

a light-emitting device and a light-receiving device;

a sleeve which optically connects the light-emitting device and the light-receiving device and the optical fiber, wherein the sleeve is constituted by a sleeve for the light-emitting device, a sleeve for the light-receiving device, and a connection which connects the light-emitting device sleeve and the light-receiving device sleeve into one piece;

a guide pipe which positions the sleeve and has a supporting portion on an inner circumferential surface thereof so that a space is formed between the guide pipe and the sleeve, wherein the supporting portion is a ferrule abutment surface and has at least three acute-angled protrusions which pinch the sleeve, and a connector body which fixes the connection.

* * * * *